(12) United States Patent
Lefebvre et al.

(10) Patent No.: US 10,029,567 B2
(45) Date of Patent: Jul. 24, 2018

(54) THROTTLE CONTROL MODULE AND VEHICLE

(71) Applicant: BOMBARDIER RECREATIONAL PRODUCTS INC., Valcourt (CA)

(72) Inventors: Michel Lefebvre, Valcourt (CA); Richard Lefebvre, Shefford (CA); Jean-Sebastien Pard, Tingwick (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 231 days.

(21) Appl. No.: 14/407,018

(22) PCT Filed: Jun. 29, 2013

(86) PCT No.: PCT/US2013/048804
§ 371 (c)(1),
(2) Date: Dec. 10, 2014

(87) PCT Pub. No.: WO2014/005131
PCT Pub. Date: Jan. 3, 2014

(65) Prior Publication Data
US 2015/0183321 A1    Jul. 2, 2015

Related U.S. Application Data

(60) Provisional application No. 61/666,443, filed on Jun. 29, 2012.

(51) Int. Cl.
*B60K 26/02* (2006.01)
*B62M 27/02* (2006.01)
(Continued)

(52) U.S. Cl.
CPC .............. *B60K 26/02* (2013.01); *B62K 11/14* (2013.01); *B62K 23/06* (2013.01); *B62M 27/02* (2013.01);
(Continued)

(58) Field of Classification Search
CPC .......... B60K 26/02; G05G 5/05; B62M 27/02
See application file for complete search history.

(56) References Cited

U.S. PATENT DOCUMENTS

| | | |
|---|---|---|
| 4,213,513 A | 7/1980 | Beck |
| 4,838,113 A | 6/1989 | Matsushima et al. |

(Continued)

FOREIGN PATENT DOCUMENTS

| | | |
|---|---|---|
| CN | 1618687 A | 5/2005 |
| CN | 101784760 A | 7/2010 |

(Continued)

OTHER PUBLICATIONS

EPO Bibliographic data (English Abstract) of JP 2005145324 (A), Atsushi et al., Sep. 2005.*

(Continued)

*Primary Examiner* — Vinh Luong
(74) *Attorney, Agent, or Firm* — BCF LLP

(57) ABSTRACT

A vehicle has a frame, and an engine and a steering assembly including a handlebar 5 connected to the frame. The laterally extending handlebar defines a handlebar axis. A throttle body, in fluid communication with the engine, has a throttle valve having open and closed positions for controlling fluid flow to the engine. A throttle control module, controlling the position of the throttle valve, comprises a housing rotatably connected to the handlebar and a lever operatively connected to the throttle valve to control its position. The lever extends 10 laterally from the housing and connects pivotably thereto. The pivot axis is perpendicular to the handlebar axis and spaced from the handlebar. The lever pivots between an idle and drive position.

20 Claims, 28 Drawing Sheets

(51) Int. Cl.
  *G05G 5/05* (2006.01)
  *F02M 35/16* (2006.01)
  *F02D 9/10* (2006.01)
  *B62K 11/14* (2006.01)
  *B62K 23/06* (2006.01)
  *F02D 11/02* (2006.01)

(52) U.S. Cl.
  CPC .............. *F02D 9/10* (2013.01); *F02D 9/105* (2013.01); *F02D 11/02* (2013.01); *F02M 35/162* (2013.01); *G05G 5/05* (2013.01)

(56) References Cited

U.S. PATENT DOCUMENTS

| | | | |
|---|---|---|---|
| 5,957,230 A | 9/1999 | Harano et al. | |
| 5,979,266 A * | 11/1999 | Nagano | B62L 3/02 74/489 |
| 6,047,611 A * | 4/2000 | Warren | B62K 23/06 74/489 |
| 6,393,933 B2 * | 5/2002 | Shirayanagi | B62M 27/00 74/489 |
| 8,459,392 B2 | 6/2013 | Bernier et al. | |
| 8,645,035 B2 | 2/2014 | Rioux et al. | |
| 8,695,744 B1 * | 4/2014 | Bedard | B62M 27/02 180/190 |
| 8,744,722 B2 | 6/2014 | Bernier et al. | |
| 8,967,117 B2 * | 3/2015 | Manjunath | F02D 11/04 123/400 |
| 9,228,581 B2 | 1/2016 | Bernier et al. | |
| 9,533,571 B1 * | 1/2017 | Urmosi | B60K 26/02 |
| 9,683,492 B2 * | 6/2017 | Bernier | F02D 9/02 |
| 2001/0045141 A1 | 11/2001 | Shirayanagi | |
| 2008/0141819 A1 * | 6/2008 | Poulos | B62K 23/04 74/502.2 |
| 2009/0065491 A1 | 3/2009 | Fitzgerald et al. | |
| 2009/0107280 A1 * | 4/2009 | Case | B62K 23/06 74/480 R |
| 2010/0043589 A1 | 2/2010 | Chandran et al. | |
| 2010/0327552 A1 * | 12/2010 | Simard | B62K 11/14 280/263 |
| 2011/0035039 A1 * | 2/2011 | Simard | B60K 26/02 700/101 |
| 2011/0042157 A1 * | 2/2011 | Rioux | B62K 5/027 180/218 |
| 2011/0303041 A1 | 12/2011 | Cheng et al. | |
| 2012/0179344 A1 * | 7/2012 | Rioux | F16H 61/66272 701/61 |

FOREIGN PATENT DOCUMENTS

| | | |
|---|---|---|
| JP | 2005145323 A | 6/2005 |
| JP | 2005145324 A | 6/2005 |
| SU | 1344679 A1 | 10/1987 |

OTHER PUBLICATIONS

Define finger—Google Search, google.com., May 21, 2017.*
Define upper—Google Search, google.com., May 21, 2017.*
Finger—Wikipedia, wikipedia.com., May 21, 2017.*
merriam-webster.com./dictionary/finger, May 21, 2017.*
Define thumb—Google Search, google.com., May 21, 2017.*
Define rearward, Google Search, google.com., Sep. 24, 2017.*
Define forward, Google Search, google.com., Sep. 24, 2017.*
English translation of JP2005145323A; retrieved from https://register.epo.org/ipfwretrieve?apn=JP.2003387818.A&Ing=en on Feb. 17, 2017.
English translation of JP2005145324A; retrieved from https://register.epo.org/ipfwretrieve?apn=JP.2003387819.A&Ing=en on Feb. 17, 2017.
Machine translation into English of SU1344679A1 translated by EPO on Jul. 26, 2017.
English abstract of CN101784760; retrieved from http://worldwide.espacenet.com/ on Mar. 9, 2016.
International Search Report of PCT/US2013/048804; dated Dec. 23, 2013; Blaine R. Copenheaver.

* cited by examiner

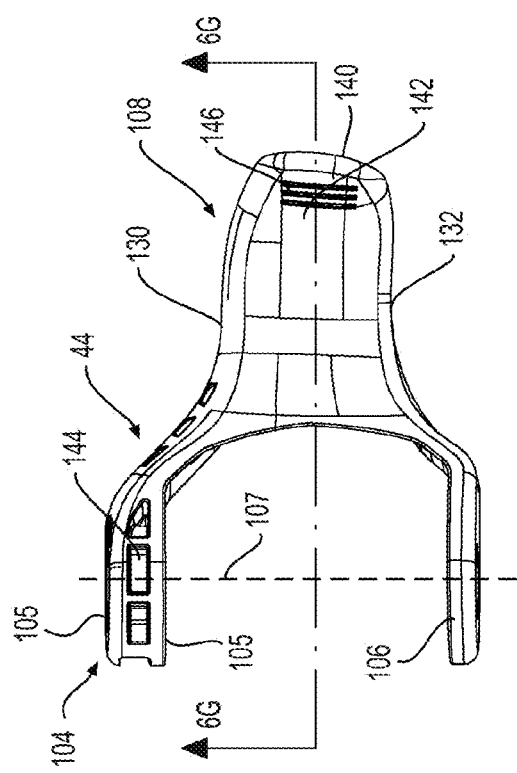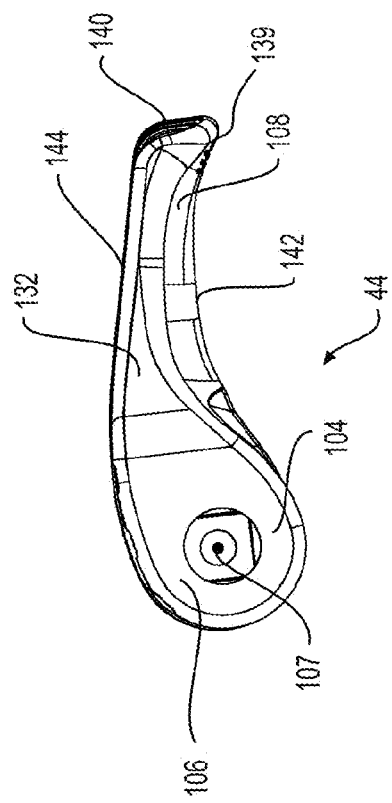
FIG. 6A
FIG. 6B

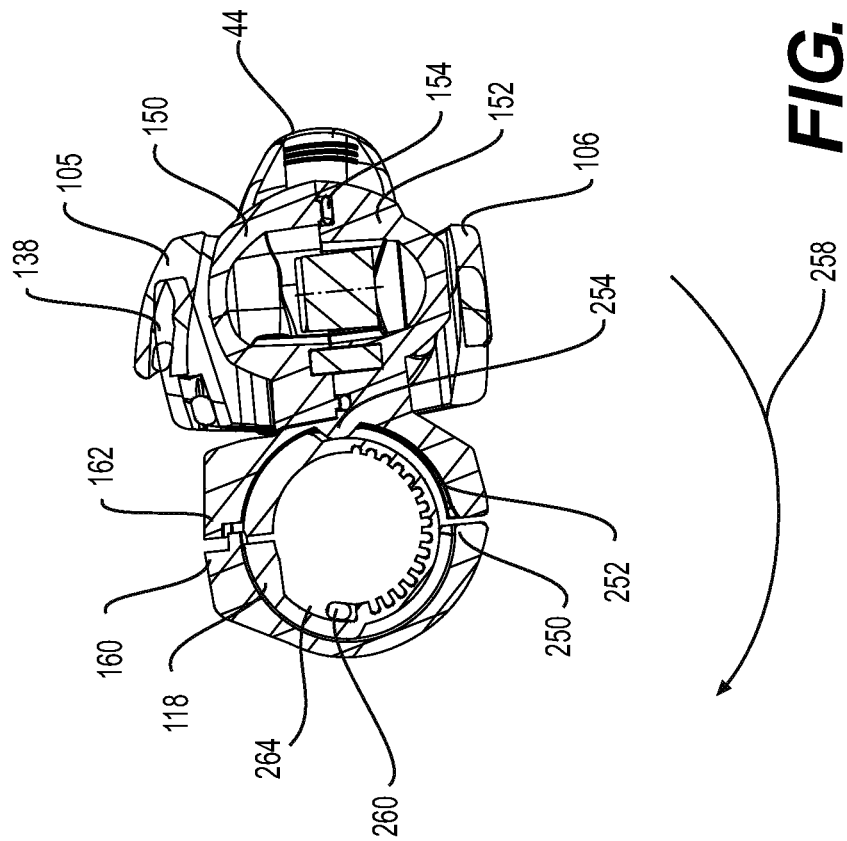

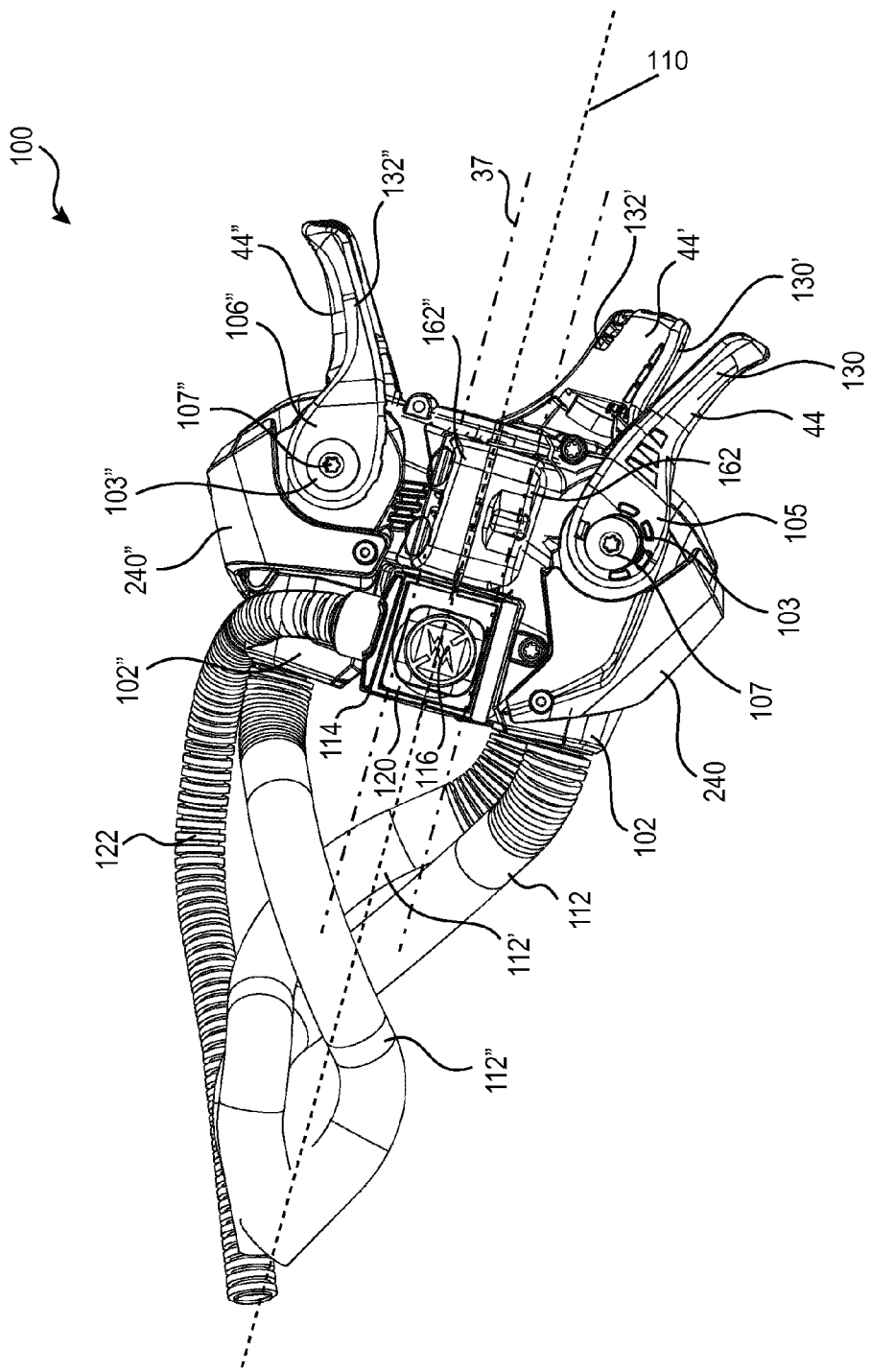

THROTTLE CONTROL MODULE AND VEHICLE

CROSS-REFERENCE

The present application claims priority to U.S. Provisional Patent Application No. 61/666,443 filed on Jun. 29, 2012, the entirety of which is incorporated herein by reference.

FIELD OF THE INVENTION

The present invention relates to throttle control modules for vehicles.

BACKGROUND

Snowmobiles and other vehicles used for recreational purposes such as all-terrain vehicles (ATVs), personal watercraft and the like have a handlebar for steering and a throttle lever on the handlebar for controlling vehicle speed. Conventionally, the throttle lever is pivotally mounted to the handlebar so that it pivots towards and away from the handlebar in response to the driver's pushing or releasing of the throttle lever to increase or decrease speed of the vehicle. The driver typically uses his or her thumb to operate the throttle lever with an over-the-handlebar grip while travelling in a forward direction. While executing sharp turns, the driver leans in the direction of the turn pulling the handlebar closer to the body. The driver's hand and arm may be positioned at such a severe angle with respect to one another that, as the driver turns the handlebar, the driver must rotate his or her hand around the handlebar to an under-the-handlebar grip, and use the index finger and/or middle finger to operate the throttle lever to maintain or increase the speed of the snowmobile. It is therefore desirable to have a throttle lever that permits a stable and secure grip on the throttle lever regardless of the finger used for gripping.

Some drivers may also prefer to use an over-the-handle finger grip instead of an over-the-handle thumb grip. Furthermore, during extended rides, the driver's hand remains in a fixed position exerting force on the throttle lever to regulate the speed of the snowmobile. Maintaining the same hand position for long periods of time can be tiring for the driver. Some of this discomfort may be alleviated by changing the grip. It would therefore be desirable to have a throttle lever that can be adjusted for different over-the-handle grips according to the driver's preference.

SUMMARY

It is an object of the present invention to ameliorate at least some of the inconveniences present in the prior art.

In one aspect, the present provides a vehicle, including a frame. A steering assembly including a handlebar is connected to the frame. The handlebar extends in a lateral direction and defines a handlebar axis. An engine is connected to the frame. A throttle body fluidly communicates with the engine. A throttle valve is included in the throttle body for controlling fluid flow to the engine. The throttle valve has an open position and a closed position. A throttle control module controls a position of the throttle valve. The throttle control module includes a throttle lever housing rotatably connected to the handlebar. A throttle lever is operatively connected to the throttle valve to control the position of throttle valve. The throttle lever extends outwardly from the throttle lever housing in the lateral direction. The throttle lever is pivotably connected to the throttle lever housing to define a pivot axis. The throttle lever is pivotable at least between an idle position and a drive position. The pivot axis extends substantially perpendicular to the handlebar axis. The pivot axis is spaced from the handlebar. The throttle lever housing is rotatable, with the throttle lever, about the handlebar at least between a thumb position in which the pivot axis is rearward of the handlebar and a finger position in which the pivot axis is forward of the handlebar.

In a further aspect, the throttle lever includes a pivot portion connected to the throttle lever housing. The pivot axis extends through the pivot portion. A thumb surface is shaped to receive a thumb for pivoting of the throttle lever by the thumb when the throttle lever housing is in the thumb position. A finger surface is shaped to receive at least one finger, other than the thumb, for pivoting of the throttle lever by the at least one finger, other than the thumb, when the throttle lever housing is in the finger position. The thumb surface and the finger surface extend laterally outwards from the pivot portion.

In an additional aspect, the finger surface is substantially flat.

In a further aspect, the thumb surface is curved downwards and outwards from the pivot portion.

In another aspect, the thumb surface is curved downwards and outwards from the pivot portion.

In a further aspect, the throttle control module further comprises a biasing member connected between the throttle lever and the throttle lever housing, the biasing member biasing the throttle lever towards the idle position.

In another aspect, the throttle control module comprises a throttle lever position sensor adapted for sensing the position of the throttle lever about the pivot axis and for sending a signal related to the position. Also included is a motor operatively connected to the throttle valve for changing the position of the throttle valve. A control unit is adapted for receiving the signal from the throttle lever position sensor and connected to the motor for controlling the motor.

In yet another aspect, the throttle lever position sensor is a Hall effect position sensor disposed inside a chamber of the throttle lever housing. The throttle lever is disposed outside the chamber. The Hall effect position sensor includes a base portion rigidly connected to the throttle lever housing. A rotary portion is rotatably connected to the base portion. A Hall effect position sensor biasing member is connected between the base portion and the rotary portion. The Hall effect position sensor biasing member is configured to bias the rotary portion toward a zero position with respect to the base portion. The rotary portion is rigidly connected to the throttle lever such that the idle position of the throttle lever corresponds to the zero position of the rotary portion.

In a further aspect, the throttle control module further comprises an adaptor rigidly connecting the throttle lever and the rotary portion of the Hall effect position sensor. The adaptor has a first flange complementary to the rotary portion of the Hall effect position sensor and a second flange complementary to the throttle lever.

In an additional aspect, the adaptor is disposed inside the chamber of the throttle lever housing.

In another aspect, the throttle control module further comprises a biasing member connected between the adaptor and the throttle lever housing. The biasing member is configured to bias the adaptor such that the rotary portion of the Hall effect position sensor is biased toward the zero position and the throttle lever is biased toward the idle position.

In another aspect, the throttle lever housing further comprises at least one input port for connecting at least one wire to the Hall effect position sensor disposed inside the chamber.

In a further aspect, the throttle control module further comprises a tubular portion for housing at least a portion of the at least one wire, the tubular portion having an end surrounding at least one of the at least one input port.

In another aspect, the throttle control module further includes a throttle lever heating element disposed inside the throttle lever for heating the throttle lever. A throttle lever heating element wire is connected to the throttle lever heater element.

In an additional aspect, the throttle lever housing has an aperture for receiving the throttle lever heater element wire from the throttle lever.

In an additional aspect, the throttle control module further comprises a cover removably connected to the throttle lever housing and adapted to cover at least a part of the throttle lever heater element wire.

In an additional aspect, the vehicle further comprises a sleeve. The sleeve includes a tubular portion disposed around the handlebar and rigidly connected to the handlebar. The throttle lever housing is rotatably connected to the tubular portion of the sleeve. The sleeve is disposed between the handlebar and the throttle lever housing.

In yet another aspect, one of the tubular portion of the sleeve and the throttle lever housing has a protrusion. The other of the tubular portion of the sleeve and the throttle lever housing has a complementary groove to prevent lateral motion of the throttle lever housing.

In a further aspect, one of the tubular portion of the sleeve and the throttle lever housing has a protrusion. The other of the tubular portion of the sleeve and the throttle lever housing has a complementary groove defining a limit for rotation of the throttle lever housing about the sleeve.

In yet another aspect, the vehicle further includes an engine cut-off switch adapted to stop an operation of the engine. An engine cut-off switch holder is connected to the sleeve. The engine cut-off switch is at least partially disposed in the engine cut-off switch holder.

In yet another aspect, the thumb and finger surfaces are not mirror images about a plane passing through the handlebar axis and through the throttle lever between the thumb surface and finger surface.

In another aspect, the throttle lever housing is rotatable, with the throttle lever, from each one of the thumb and finger positions, in a direction such that the throttle lever moves away from the engine cut-off switch.

In another aspect, the thumb and finger surfaces are mutually asymmetric about a plane passing through the handlebar axis and through the throttle lever between the thumb surface and finger surface.

In another aspect, the present provides vehicle having a frame. A steering assembly including a handlebar is connected to the frame. The handlebar defines a handlebar axis. A motor is connected to the frame. A throttle control module controls an operation of the motor. The throttle control module includes a throttle lever housing rotatably connected to the handlebar. A throttle lever is operatively connected to the motor. The throttle lever extends outwardly from the throttle lever housing in the lateral direction. The throttle lever is pivotably connected to the throttle lever housing to define a pivot axis. The throttle lever is pivotable at least between an idle position and a drive position. The pivot axis extends substantially perpendicular to the handlebar axis. The pivot axis is spaced from the handlebar. The throttle lever housing is rotatable, with the throttle lever, about the handlebar at least between a thumb position in which the pivot axis is rearward of the handlebar and a finger position in which the pivot axis is forward of the handlebar.

In another aspect, a direction parallel to the handlebar axis is the first direction. A direction perpendicular to the handlebar axis and the pivot axis is the second direction. The throttle lever comprises a point farthest from the pivot axis. A displacement of the point in the first direction and between the idle and drive positions is the first direction displacement. A displacement of the point in the second direction and between the idle and drive positions is the second direction displacement. The first direction displacement is substantially less than the second direction displacement.

In another aspect, a direction parallel to the handlebar axis is the first direction. A direction perpendicular to the handlebar axis and the pivot axis is the second direction. The throttle lever comprises a point farthest from the pivot axis. A displacement of the point in the first direction and between the idle and drive positions is the first direction displacement. A displacement of the point in the second direction and between the idle and drive positions is the second direction displacement. The first direction displacement being generally zero.

For purposes of the present application, terms related to spatial orientation when referring to a vehicle and components in relation to the vehicle, such as "forwardly", "rearwardly", "left", "right", "above" and "below", are as they would be understood by a driver of the vehicle driving the vehicle, with the vehicle in a straight ahead orientation (i.e. not steered left or right), and in an upright position (i.e. not tilted).

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIGS. 6A to 6F are various views of the throttle lever of FIG. 4A disposed in a thumb position, FIG. 6A is a rear elevation view, FIG. 6B is a bottom plan view, FIG. 6C is a top plan view, FIG. 6D is a left side elevation view, FIG. 6E is a right side elevation view, FIG. 6F is a front elevation view.

FIG. 9C is a cross-sectional view of the throttle control module of FIG. 4A taken along the line 9C-9C;

FIG. 15 is a top plan view of a portion of the throttle control module of FIG. 4A illustrating the rotation of the throttle control module from the finger position, via an intermediate position to the thumb position.

DETAILED DESCRIPTION

Although a snowmobile is being described herein, it should be understood that the present invention could also be applied to other kinds of vehicles such as, for example, all-terrain vehicles (ATV), motorcycles, three-wheeled motorized vehicles, and personal watercraft.

Figure 1:
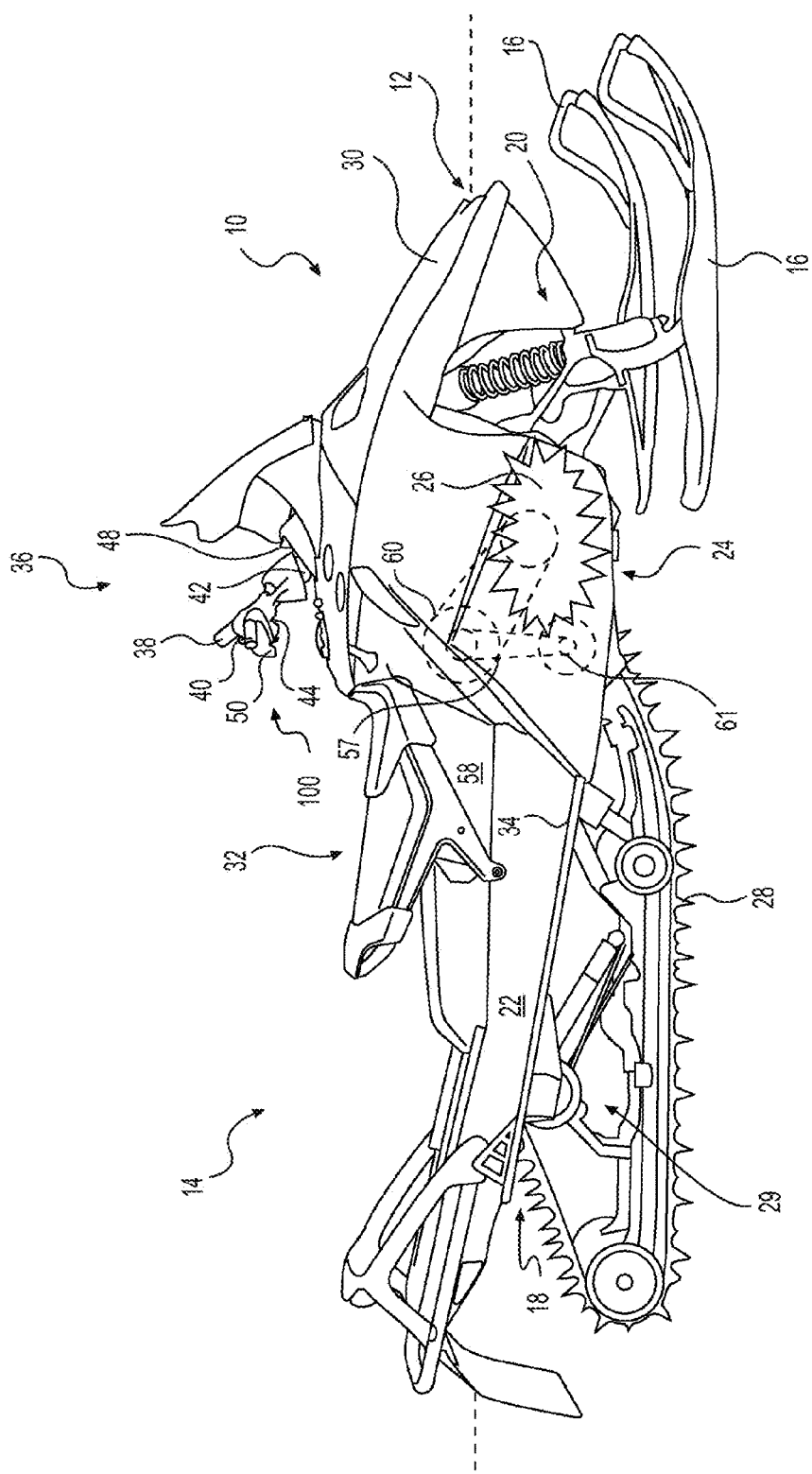
FIG. 1 is a right side elevation view of a snowmobile having a throttle control module.

FIG. 1 shows a side elevation view of a snowmobile 10 having a forward end 12 and a rearward end 14 consistently defined with the forward travel direction of the snowmobile 10. The snowmobile 10 has two laterally spaced skis 16, each mounted on the frame 18 via a front suspension assembly 20 in a known manner. The frame includes a tunnel portion 22 and an engine compartment 24 forward of the tunnel portion 22. The tunnel portion 22 generally includes one or more pieces of sheet metal bent into an inverted U-shape. A rear track 28 is disposed under the tunnel portion 22 and connected to it by a rear suspension assembly 29 in a known manner. An engine 26 (schematically illustrated in FIG. 1) drives the rear track 28 by rotating a drive sprocket (not shown) to propel the snowmobile 10. The operation of the engine 26 is controlled by an engine control unit (ECU) 50 (FIG. 2). The snowmobile frame 18 also supports a body composed of a number of fairings 30 which provide aesthetic appeal and protection from dirt and snow that may be lifted by the rear track 28 while the snowmobile 10 is in use.

A straddle seat 32 mounted on the frame provides a seating position for a driver. The snowmobile 10 may alternatively have additional seating positions for one or two passengers. A pair of footrests 34 are provided below the seat 32 for the driver to rest his feet thereon.

Figure 2A:
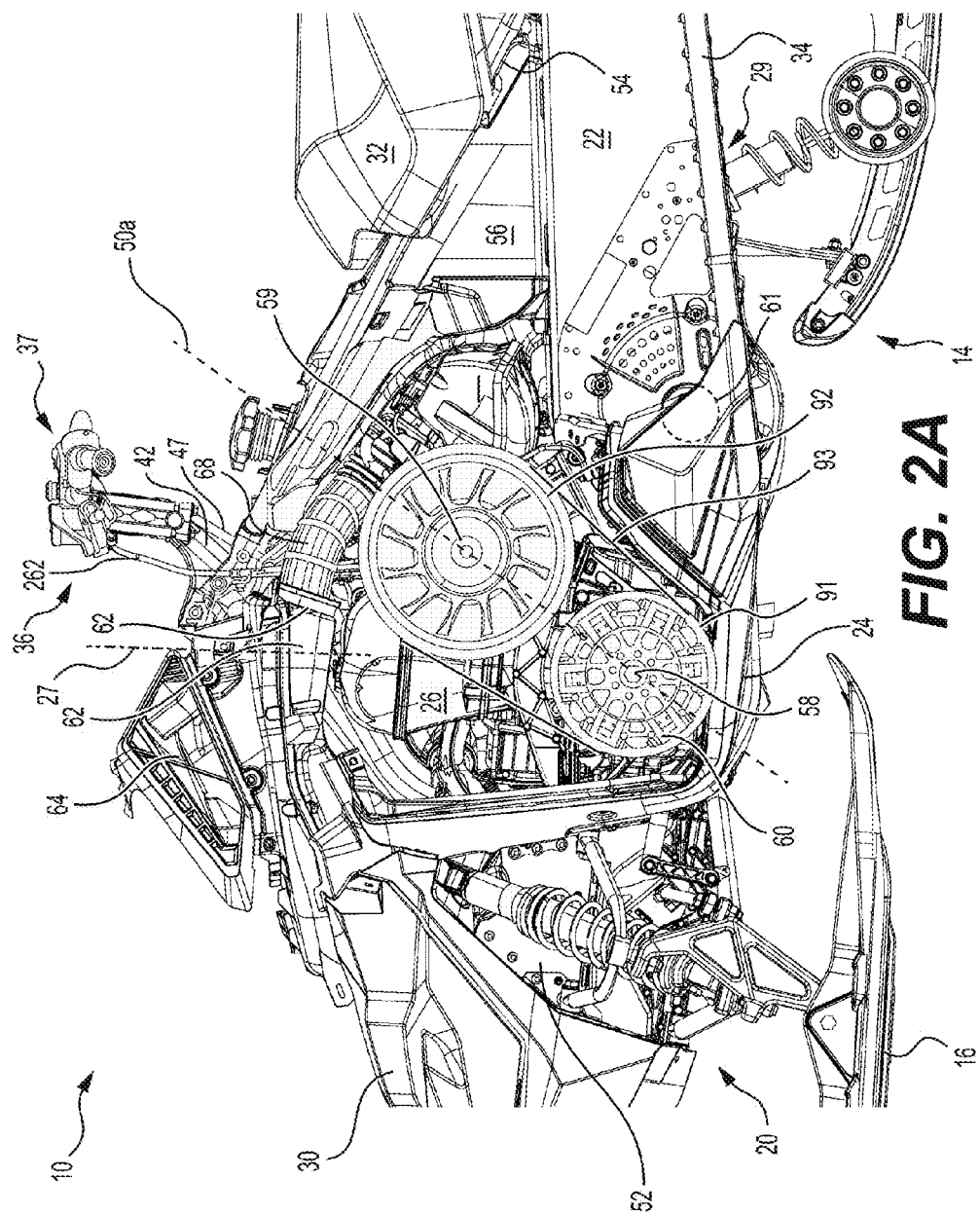
FIGS. 2A and 2B are left side elevation views of portions of the snowmobile of FIG. 1 showing the engine, frame and other components.
Figure 4A:
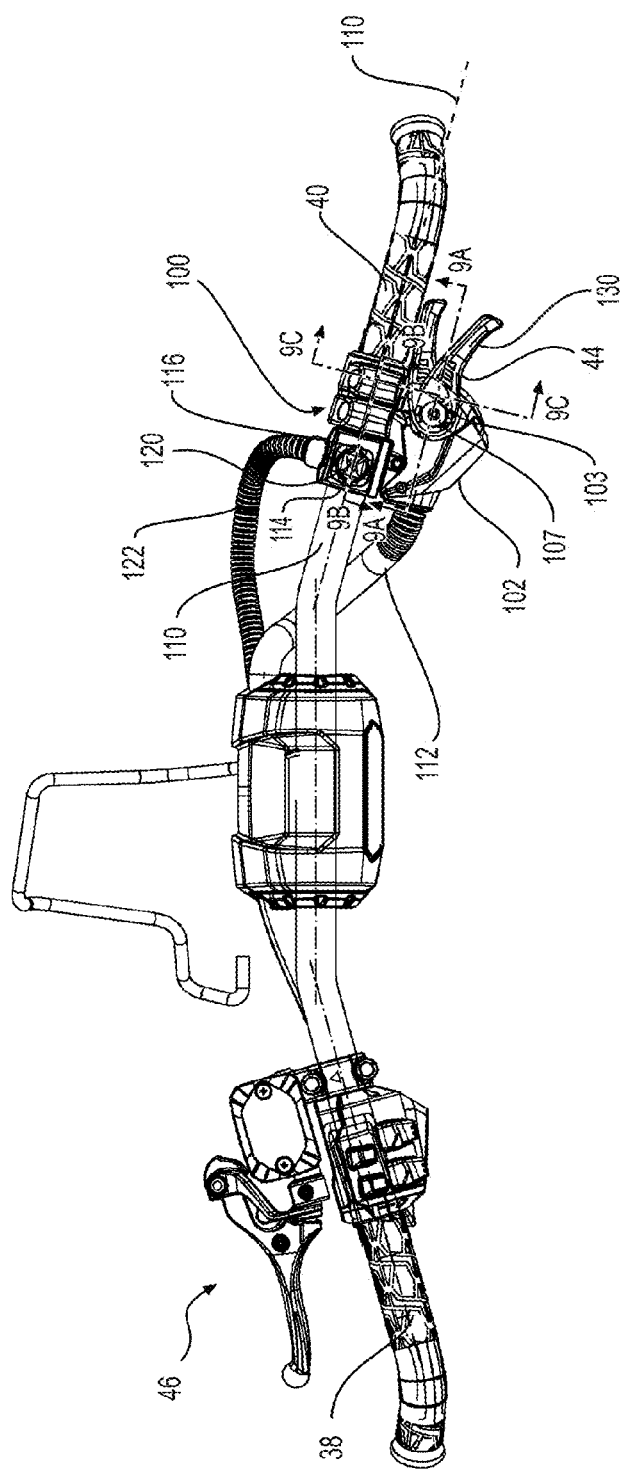
FIGS. 4A and 4B are top plan views of the handlebar of the snowmobile of FIG. 1 showing the throttle control module with a throttle lever in a thumb position and a finger position respectively.
Figure 9A:
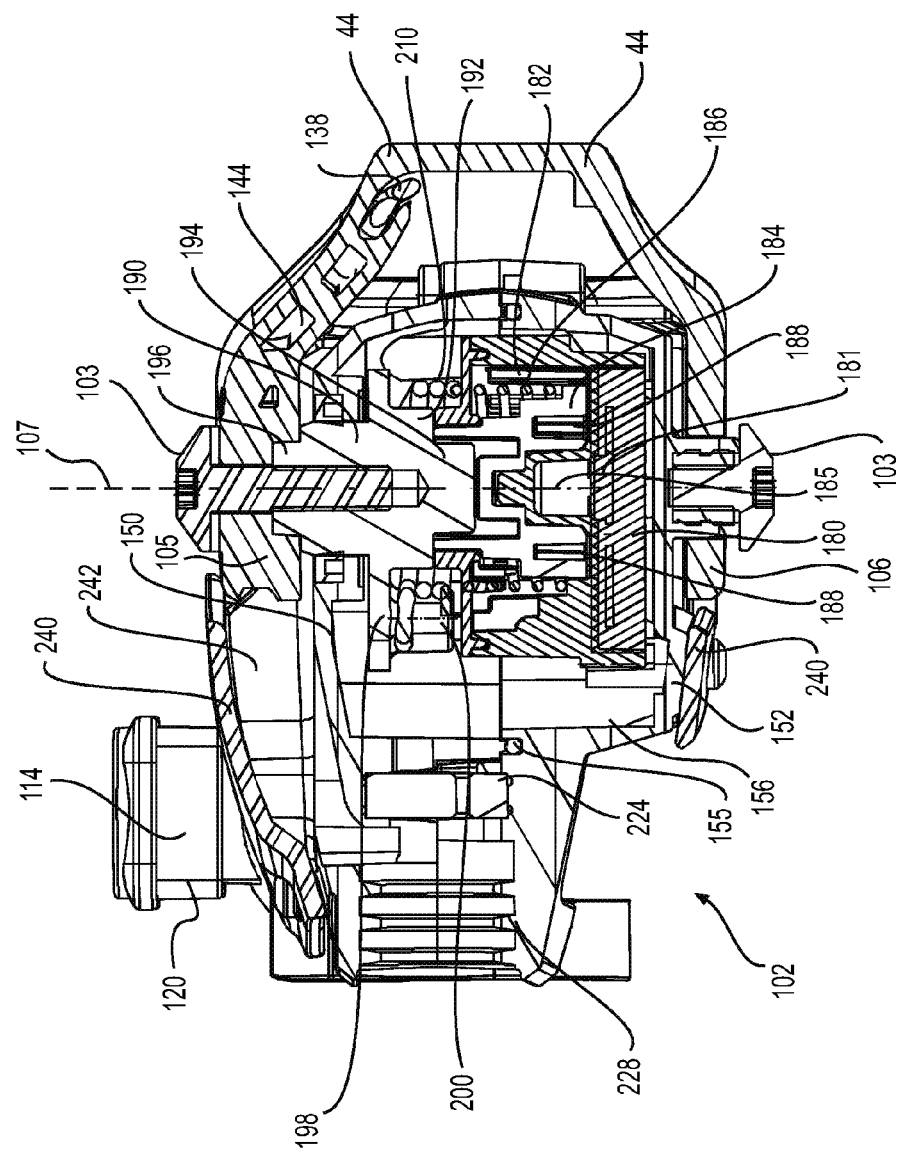
FIG. 9A is a cross-sectional view of the throttle control module of FIG. 4A taken along the line 9A-9A.
Figure 9B:
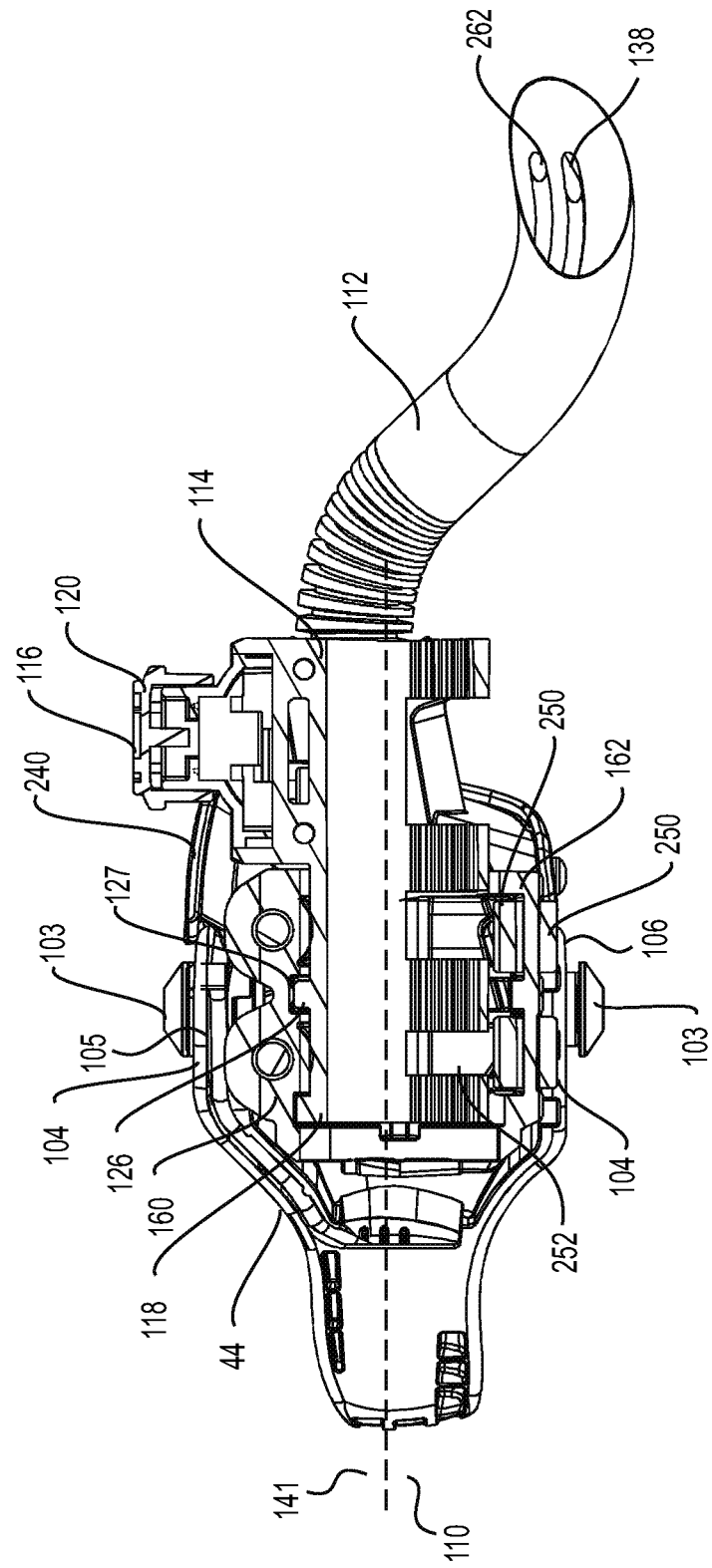
FIG. 9B is a cross-sectional view of the throttle control module of FIG. 4A taken along the line 9B-9B.

A steering assembly 36, including a handlebar 37 and a steering column 42, is provided generally forward of the seat 32. The handlebar 37 extends generally laterally and has a left hand grip 38 and a right hand grip 40, that can be gripped by the snowmobile driver. The handlebar 37 is connected to the steering column 42 extending generally vertically downwards and forwards to operatively connect to the front skis 16 in a known manner, such that turning the handlebar 37 turns the skis 16 to steer the snowmobile 10. A brake actuator, in the form of a hand brake lever 46 (FIG. 4A), is provided adjacent to the left hand grip 38 for braking the snowmobile 10 in a known manner. The brake lever 46 on the left side of the handlebar 37 is connected to the brakes (not shown) via a brake line 47 (FIG. 2A). A throttle control module 100, including a throttle lever 44, is provided adjacent to the right hand grip 40 for controlling the power delivered by the engine 26. The throttle lever 44 on the right side of the handlebar 37 is connected to the ECU 50 via an electronic throttle control wire 262 (FIG. 9B) carried inside tubing 112 (FIGS. 2, 4A, 9B). A display cluster 48 is also provided forward of the seat 32 to display messages and operational information to the snowmobile driver.

Figure 2B:
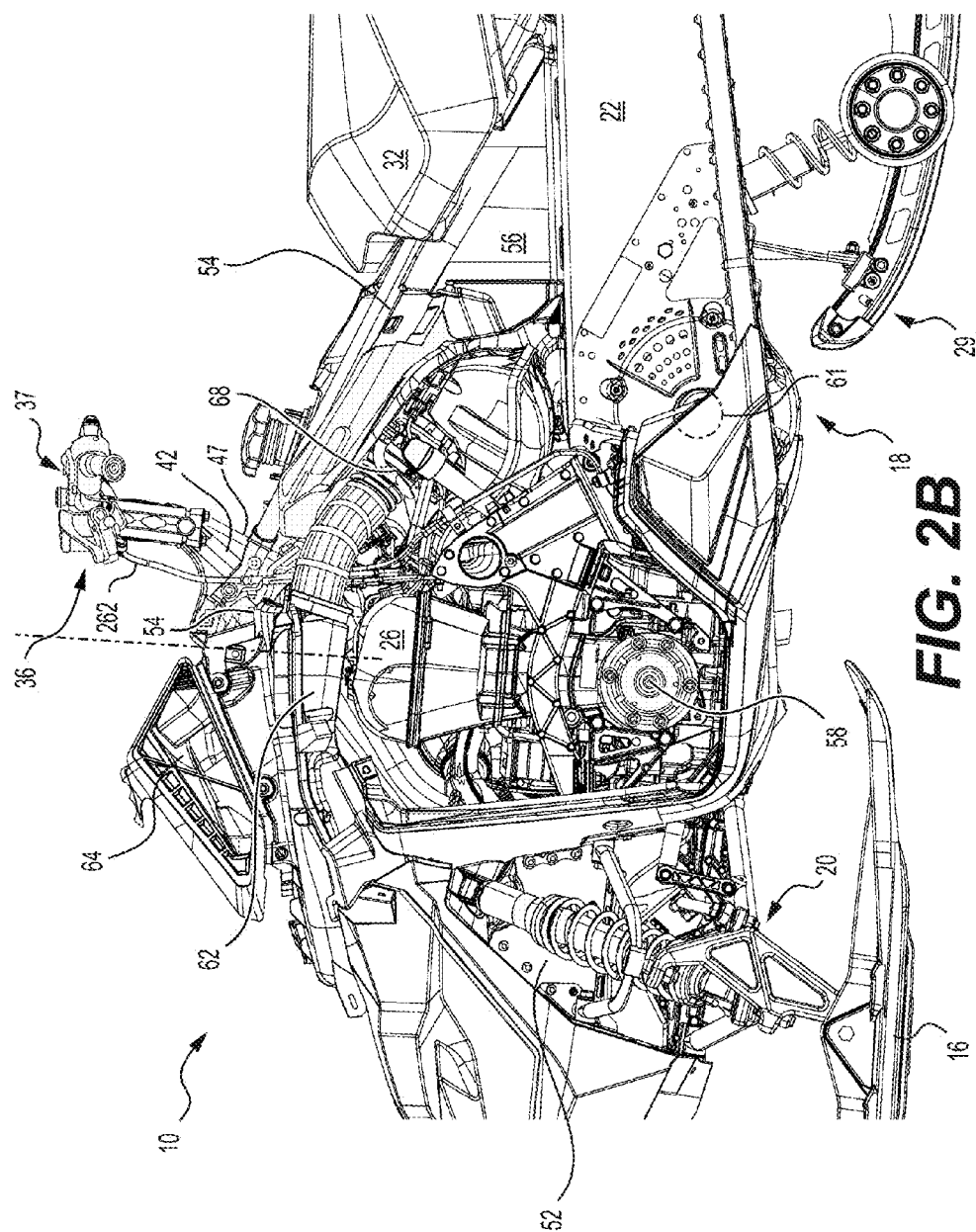

With reference to FIGS. 2A and 2B, the frame 18 also has an upper structure 54 extending upwards from the tunnel 18 and engine compartment 24. The handlebar 37 and the steering column 42 are attached to the upper structure 54 rearward of the engine cylinder axis 27. The front suspension assembly 20 and skis 16 are connected by a front suspension module 52 to the front end of the engine compartment 22. The engine 26 is supported in the engine compartment 22. A fuel tank 56 and the seat 32 are supported on the tunnel 22.

The engine 26 is connected to the drive sprocket (not shown) and rear track 28 via a transmission 60 (shown in FIG. 2A, removed for clarity in FIG. 2B) and a reduction gear (not shown). The engine 26 is an inline, three-cylinder, four-stroke, internal combustion engine. Alternatively, the engine could be a two-stroke internal combustion engine, a carbureted engine, or any other suitable engine or motor capable of propelling of the snowmobile 1. The transmission 60 is a continuously variable transmission (CVT) comprising a variable diameter drive pulley 91 coupled to a variable diameter driven pulley 92 by a belt (not shown). It is contemplated that other kinds of transmissions could also be used. The output shaft 58 of the engine 26 is connected to the transmission 60 through the drive pulley 58. The countershaft 59 of the transmission 60 is connected to the front drive axle 61 (shown schematically) of the drive sprocket via the reduction gear on the right side of the snowmobile 10.

The internal combustion engine 26 receives fuel from the fuel tank 56 and air from an airbox 62. The airbox 62 is disposed above the engine 26 and supported by the upper structure 54. Air enters the airbox 62 through an inlet 64 in the front portion of the snowmobile 10. The air is then directed through the airbox 62 rearwards and downwards behind the engine 26 into a throttle body 68 disposed rearward of the engine cylinder axis 27, and from the throttle body 68 into the engine 26. Fuel is delivered from the fuel tank 56 via a fuel injection system (not shown) to the engine 26. The throttle body 68 is disposed below the handlebar 37 and longitudinally aligned with it but its position will be mainly determined by, amongst other criteria, engine and tank placement.

Figure 3:
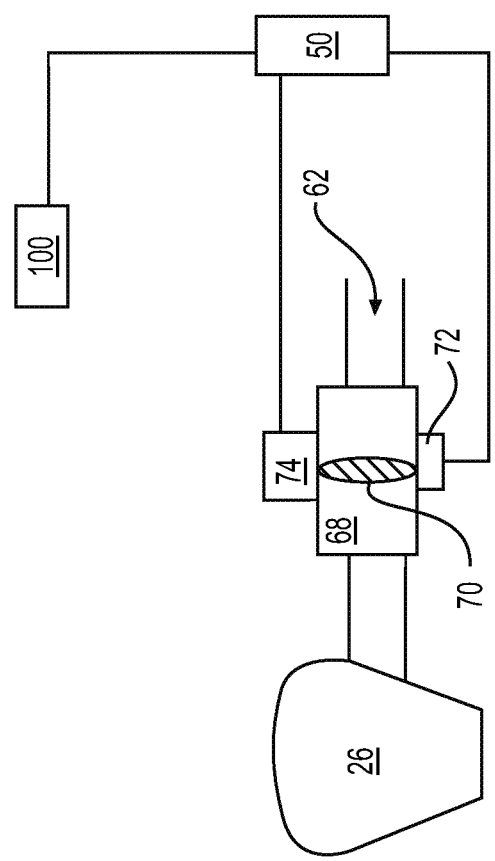
FIG. 3 is a schematic illustration of the throttle body having a throttle valve and its connections to a control unit and a throttle control module.

With reference to FIG. 3, the throttle body 68 comprises a throttle valve 70 that regulates the amount of air flowing through the throttle body 68 entering into the engine 26, which determines in part the mixture of fuel and air burned in each combustion cycle of the engine 26, and thereby the power delivered by the engine 26. The throttle valve 70 is a butterfly valve comprising a circular disc mounted inside the tubular throttle body 68 that rotates about a rod passing through a diameter of the disc. The passage of air through the tubular throttle body 68 is obstructed by varying amounts as the disc rotates about the rod. The throttle valve 70 is in a fully open position (minimal obstruction of air flow) when the circular surface of the disc is at its minimum angle with respect to the central axis of the tubular throttle body 68, and in a fully closed position (maximal obstruction of air flow) when the circular surface of the disc is at its maximum angle with respect to the central axis of the tubular throttle body 68.

In the present embodiment, the snowmobile 10 has a drive-by-wire (DBW) throttle control module 100 in which the throttle valve 70 is controlled electronically instead of having a mechanical linkage between the throttle lever 44 and the throttle valve 70. The position of the throttle valve 70 is monitored by a throttle valve position sensor 72. An actuator 74 is connected to the throttle valve 70 for actuating it to adjust the air flow into the engine 26. The actuator 74 is controlled based in part on signals received from the ECU 50, which are based on signals received by the ECU 50 from the throttle control module 100, the throttle valve position sensor 72, engine RPM as well as other input signals. The operation of the electronic throttle control module 100 having the throttle lever 44 will be discussed below in further detail.

The ECU 50 controls operation of the snowmobile 10. The ECU 50 receives signals from various sensors in order to control operation of the snowmobile 10. Sensors (not shown) connected to the ECU 50 include a manifold pressure sensor, an engine coolant temperature sensor, an air flow sensor, an intake air temperature sensor, fuel temperature and pressure sensors, crankshaft position sensor, vehicle speed sensor, transmission sensor and the like. The ECU controls the operation of the engine 26 and other components of the snowmobile 10 based on the information received from the various sensors. In addition to the throttle valve 70 mentioned above, the ECU 50 is also connected to spark plugs (not indicated) for causing the combustion of fuel within the engine 26, and to fuel pumps (not shown) and fuel injectors (not shown) for controlling the fuel supply to the engine 26. The ECU 50 is also connected to the display cluster 48 for sending signals to the display cluster 48 to display information to the snowmobile driver. It is contemplated that the ECU 50 could only be connected to some of these components and not to others. It is also contemplated that the snowmobile 10 could not include all of these components. For example, the engine 26 could be supplied with fuel via a carburetor, in which case the snowmobile 10 would not include a fuel injector. In a carbureted engine, the throttle valve 70 is located inside the carburetor and the throttle body 68 is replaced with a carburetor body. For the purposes of the present, the term "throttle body" refers to a carburetor as well as a throttle body.

Figure 4B:
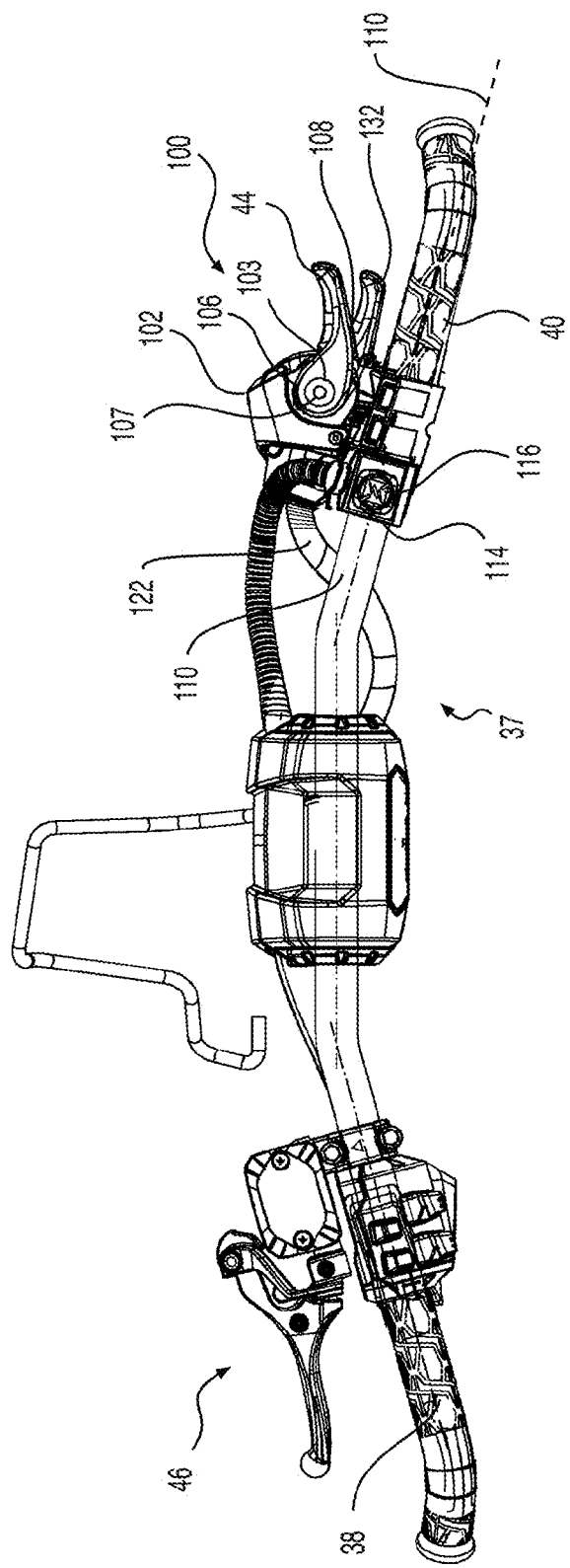

With reference to FIGS. 4A and 4B, the throttle control module 100 used by the driver to adjust the power delivered by the engine 26 will be described. The throttle control module 100 is mounted to the right side of the handlebar 37 adjacent to the right hand grip 40. The throttle control module 100 comprises a throttle lever housing 102 and the throttle lever 44 pivotably connected to the throttle lever housing 102. The throttle lever housing 102 is rotatable mounted on the handlebar 37.

The throttle lever 44 has a pivot portion 104 and a lever portion 108. The pivot portion 104 is pivotally fastened to the throttle lever housing 102 by a screw 103. The lever portion 108 extends laterally outwards from the pivot portion 104. The snowmobile driver grips the right hand grip 40 and throttle lever 44 with the right hand and applies force to the throttle lever 44 to pivot it towards the handlebar 37 for increasing the power delivered by the engine 26. The pivot axis 107 coincides with the shaft of the screw 103 and is perpendicular to the handlebar axis 110.

In the "idle" position of the throttle lever 44, where the end of the lever 44 is farthest away from the handlebar 37, the throttle lever 44 forms an acute angle with the handlebar axis 110. When the throttle lever 44 is pivoted towards the handlebar 37, it is in a "drive" position where the angle between the throttle lever 44 and the handlebar axis 110 is smaller than in the idle position. Other angular configurations are also contemplated for the throttle lever 44. As will be discussed in more detail later, the throttle lever 44 is biased towards the "idle" position and in the absence of an external force applied on it, the throttle lever 44 is disposed in the "idle" position.

The position of the throttle valve 70 in the throttle body 68 is adjusted in part based on the position of the throttle lever 44 about the pivot axis 107. The throttle control module 100 sends signals to the ECU 50 related to the position of the throttle lever 44 by a wire 262 housed inside tubing 112. In general, the throttle valve 70 is opened further to allow more air flow through the throttle body 68 with the throttle lever 44 in the "drive" position than in the "idle" position, however, adjustment of the air flow and throttle valve position in the throttle body 68 would also depend on inputs received from other sensors and the power requirements for other operations of the snowmobile 10. Tubing 112 extending from the throttle lever housing 102 also includes other wires such as wire 138 (FIG. 6G) providing power to the throttle lever heating element 136 (FIG. 6G) located inside the throttle lever 44.

As mentioned above, the throttle lever housing 102 can be rotated about the handlebar 37 to rotate the throttle lever 44 between a finger position (FIG. 4B), where the pivot axis 107 is forward of the handlebar 37, and a thumb position (FIG. 4A), where the pivot axis 107 is rearward of the handlebar 37. The throttle lever housing 102 is rotated between the finger and thumb positions with the throttle lever 44 passing below the handlebar 37. The throttle lever housing 102 can thus be rotated about the handlebar 37 to rotate the throttle lever 44 between a first position (i.e., the thumb position) and a second position (i.e., the finger position).

With reference to FIG. 4A, when the throttle lever 44 is in the thumb position, the snowmobile driver can pivot the throttle lever 44 towards the right hand grip 40 using the thumb of the right hand and an over-the-handlebar grip. When the throttle lever 44 is in the thumb position, the snowmobile driver can also operate the throttle lever 44 using one of the fingers other than the thumb of the right hand by using an under-the-handlebar grip.

With reference to FIG. 4B, when the throttle lever 44 is in the finger position, the snowmobile driver can pivot the throttle lever 44 towards the right hand grip 40 using the forefinger of the right hand gripping the hand grip 40 in an over-the-handlebar grip. It is contemplated that the throttle lever 44 could be dimensioned and shaped such that one or more of the right hand fingers (other than the thumb) could be used to operate the throttle lever 44.

The "idle" position of the throttle lever 44 is the position where the free end of the lever 44 is farthest from the handlebar 37 whether the throttle lever 44 is in a finger position or a thumb position. The above discussion refers to the intended manner of actuating the throttle lever 44, however, the driver can choose to actuate the throttle lever with the digit of their choice.

Figure 5A:
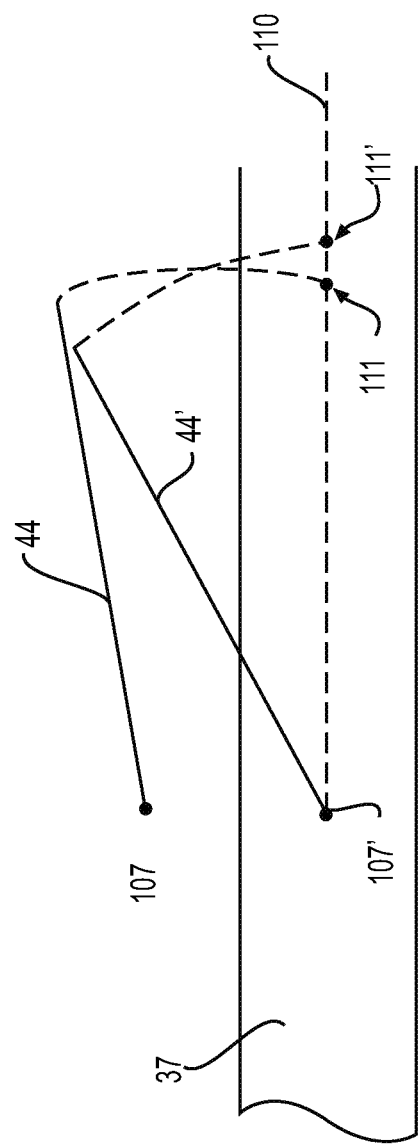
FIG. 5A is a schematic illustration of the handlebar and throttle lever of FIG. 4B.
Figure 5B:
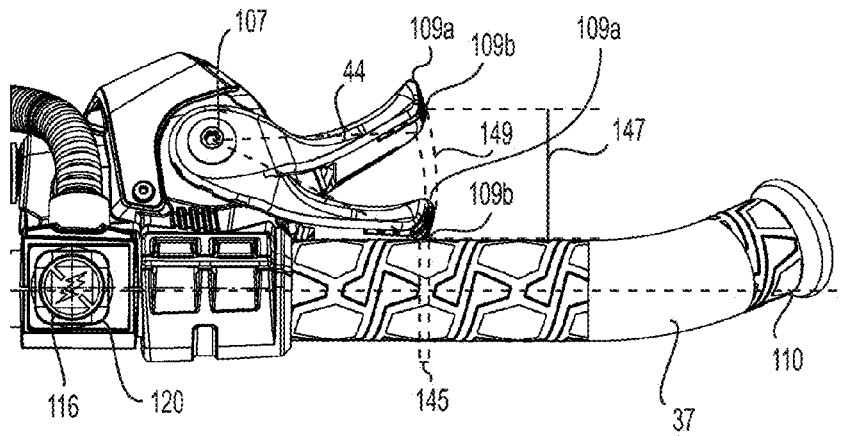
FIG. 5B is a top plan view of a portion of a handlebar with the throttle lever of FIG. 4A mounted thereon in a finger position.
Figure 5C:
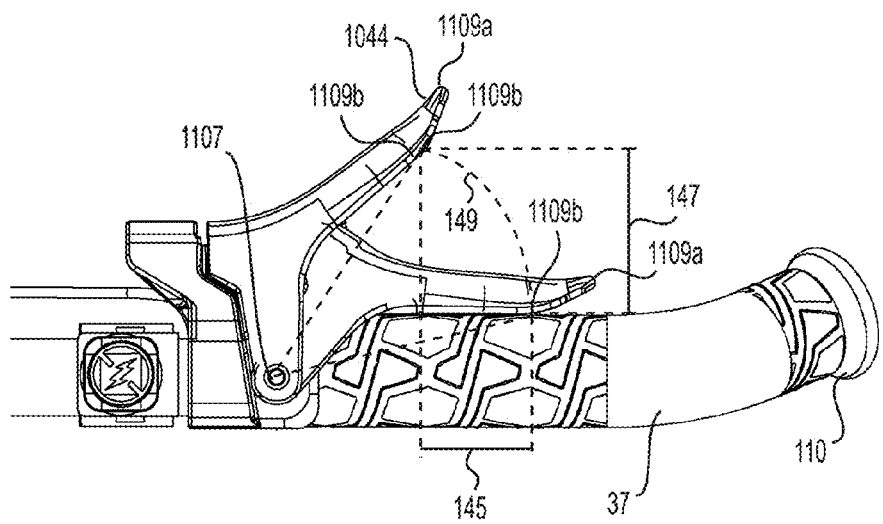
FIG. 5C is a top plan view of a portion of the handlebar of FIG. 5B a prior art throttle lever mounted thereon.

With reference to FIGS. 5A to 5C, the displacement of the throttle lever 44 with respect to the handlebar 37 will now be discussed. For simplicity, for the purpose of describing FIGS. 5A to 5C, the handlebar axis 110 is assumed to be in the lateral direction. The description however also applies to handlebars 37 which may not be disposed with the handlebar axis in the lateral direction.

With reference to FIG. 5A, it can be seen that the pivot axis 107 of the throttle lever 44 is spaced from the handlebar 37 as mentioned above. This separation provides more clearance for the fingers, especially in the finger position. When a throttle lever 44', having a pivot axis 107', is pivoted towards the handlebar 37 using the forefinger, it makes contact with the handlebar 37 at 111'. A throttle lever 44 with its pivot axis at 107 will make contact with the handlebars 37 at 111. As seen from FIG. 5A, contact point 111 of the throttle lever 44 is located laterally further inwards on the handlebar 37 (and further from the other fingers) than the contact point 111' of the throttle lever 44'. Thus, having the pivot axis 107 spaced from the handlebar 37 provides a convenient finger grip and minimizes the probability of having fingers pinched while operating the throttle lever 44 with the forefinger (and additional fingers other than the thumb).

FIG. 5B shows idle and drive position configurations of the throttle lever 44 of FIG. 4B mounted to the right side of a handlebar 37 in a finger position. The pivot axis 107 of the throttle lever 44 is disposed longitudinally forward of the handlebar axis 110 as mentioned above. FIG. 5C shows idle and drive position configurations of a conventional throttle lever 1044 mounted to the right side of the handlebar 37 and disposed in a finger position. The pivot axis 1107 of the throttle lever 1044 is longitudinally aligned with the handlebar 37 and disposed longitudinally rearward of the handlebar axis 110.

With reference to FIG. 5C, as the lever 1044 rotates from the idle position towards the handlebar 37 and the drive position, a point 1109a of the throttle lever 1044 farthest from the pivot axis 1107 is displaced laterally outwardly as it moves towards the handlebar 37. Due to the shape of the throttle lever 1044 which converges to the point 1109a, the point 1109a does not make contact with the handlebar 37 in the drive position. A point 1109b is the point farthest from the pivot axis 1107 along the rearward edge of the throttle lever 1044 that makes contact with the front edge of the handlebar 37. The point 1109b also moves laterally outwardly as the lever 1044 moves toward the handlebar 37. The lateral direction displacement 145 of the point 1109b is smaller than its longitudinal displacement 147. The lateral displacement 145 of the point 1109b is also smaller than the displacement 149 in the circumferential direction with respect to the pivot axis 107. The lateral displacement 145 is however of a magnitude generally that is generally comparable to the lengths 147, 149.

With reference to FIG. 5B, the throttle lever 44 has a corresponding point 109a, which is farthest from the pivot axis 107, and a point 109b which is the laterally outwardmost point along the rear edge of the throttle lever 44 that contacts the handlebar 37. Each of the points 109a, 109b is displaced laterally inwardly in the drive position compared to the idle position. In contrast to the points 1109a, 1109b of the throttle lever 1104 Each of the points 109a, 109b is displaced laterally inwardly in the drive position compared to the idle position. For each point 109a, 109b, the lateral displacement 145 is substantially smaller than its longitudinal displacement 147 or the circumferential distance 149. In fact, the lateral distance 145 is generally negligible compared to the length 147, 149.

It is contemplated that the pivot axis 107 of the throttle lever 44 could be disposed such that the point 109a, or 109b could be disposed further laterally outwardly in the drive position than in the idle position. The lateral displacement 145 however, whether in the outward direction or the inward direction, would be substantially smaller than the longitudinal displacement 147 and circumferential displacement 149.

The handlebar axis 110 of the handlebar 37 shown in FIGS. 5A to 5C is oriented in the lateral direction. In general, as can be seen in FIG. 4B, the handlebar axis 110 could be oriented at an angle to the lateral direction. In this case, a first direction can be defined as being parallel to the handlebar axis 110. A second direction can be described as being perpendicular to the handlebar axis 110 and the pivot axis 107. The displacement 145 would be a first direction displacement 145 instead of a lateral displacement, and the displacement 147 would be a second direction displacement 147 instead of the longitudinal displacement 147.

With reference to FIGS. 4A and 4B, the snowmobile also includes an engine cut-off switch 116. The engine cut-off switch 116 is a push-pull button switch connected to the ECU 50 for quickly turning off the engine 26, for example, in an emergency situation. The engine cut-off switch 116, extends upwards from an engine cut-off switch holder 120. The position of the engine cut-off switch 116 close to the right hand grip 40 enables the snowmobile driver to easily reach the engine cut-off switch 116 and to operate it to stop engine operations quickly.

The engine cut-off switch 116 is connected to the ECU 50 by an engine cut-off switch wire (not shown) carried inside tubing 122 extending from the sleeve 114. The ECU 50 may terminate engine operation by preventing current flow to either the fuel pump or the fuel injectors to deprive the engine 26 of fuel, or it may stop current flow to the spark plugs to prevent fuel combustion in the engine 26. It is also contemplated that the ECU 50 may use two or more of these methods concurrently to stop snowmobile motion and/or engine operation. Other methods of preventing movement of the snowmobile 10 may be apparent to a person skilled in the art, and any of these other methods are considered to be within the scope of the present invention.

Figure 7:
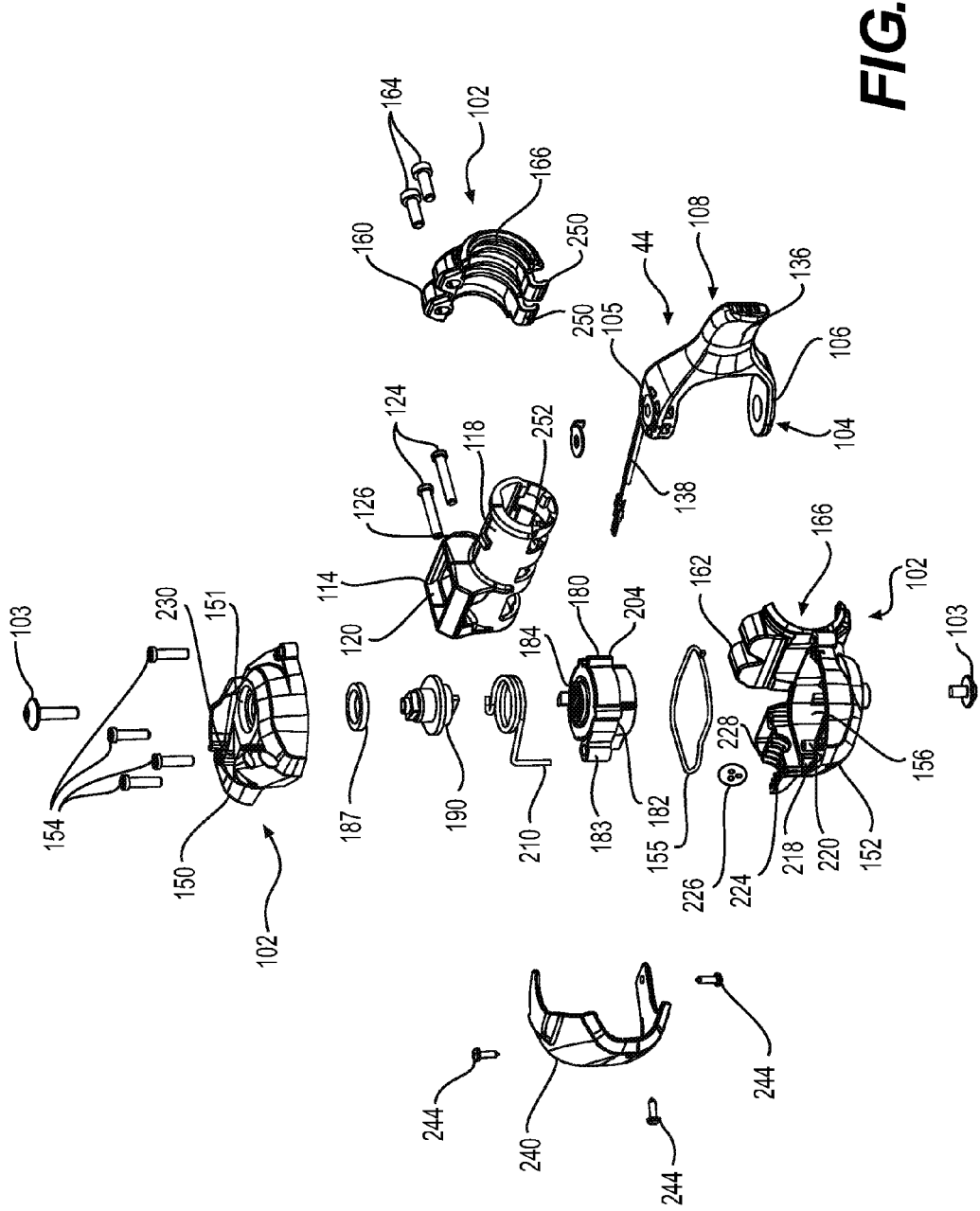
FIG. 7 is an exploded perspective view, taken from a rear, right side, of the throttle control module of FIG. 4A.

With reference to FIG. 7, the engine cut-off switch holder 120 is connected to a sleeve 114 surrounding the handlebar 37 (best seen in FIG. 7) so that it remains rotationally and laterally fixed on the handlebar 37. The throttle lever housing 102 surrounds the tubular portion 118 of the sleeve 114 laterally outwardly of the engine cut-off switch. The throttle lever housing 102 rotates around the sleeve 114 about the handlebar axis 110. The throttle lever housing 102 rotates such that the throttle lever 44 moves between the finger and thumb positions passing below the handlebar 37 so as to avoid interference with the engine cut-off switch 116 and inadvertent actuation of the engine cut-off switch 116.

The throttle lever housing 102 surrounds the sleeve 114 in a snug-fit manner so that it can be rotated about the sleeve 114 and the handlebar 37 to rotate the throttle lever 44 between the finger position, where the pivot axis 107 is forward of the handlebar 37, and the thumb position, where the pivot axis 107 is rearward of the handlebar 37, with the lever 44 passing below the handlebar 37 as shown in FIG. 15. The throttle lever housing 102 surrounds the sleeve 114 sufficiently tightly so that a snowmobile driver can rotate the throttle lever housing 102 about the sleeve 114 and the handlebar 37 without having to remove or loosen any fasteners, while also ensuring that the throttle lever housing 102 cannot be accidentally or unintentionally rotated when pivoting the throttle lever 44 while driving the snowmobile 10. The sleeve 114 is mounted tightly to the handlebar 37 so that it remains laterally and rotationally fixed to the handlebar 37 during normal use of the throttle lever 44, and even while the throttle control module 100 is being rotated between the thumb and finger positions.

With reference to FIG. 6A to 6G, the throttle lever 44 will be discussed in further detail. The throttle lever 44 has a thumb surface 130 (upper surface of the throttle lever 44 when the throttle lever 44 is in the thumb position) and a finger surface 132 (upper surface of the throttle lever 44 when the throttle lever 44 is in the finger position) which are not mirror images about a plane 141 passing through the handlebar axis 110 and through the throttle lever 44 between the thumb surface 130 and finger surface 132. In other words, the thumb and finger surfaces 130, 132 are mutually asymmetric about the plane 141. The pivot portion 104 of the throttle lever 44 has a first flange 105 extending from the thumb surface 130 and a second flange 106 extending from the finger surface 132.

With reference to FIG. 6A, the thumb surface 130 (which may be referred to as a first surface) is ergonomically shaped to be suitable for a thumb grip of the throttle lever 44. The thumb surface tapers downwards from the pivot portion 104 to a gently curved middle portion and then contours downwards again at the outer edge 140. The gently curved thumb surface 130 provides a comfortable contact with the webbing between the thumb and the forefinger when the throttle lever 44 is in the thumb position.

Figure 6E:
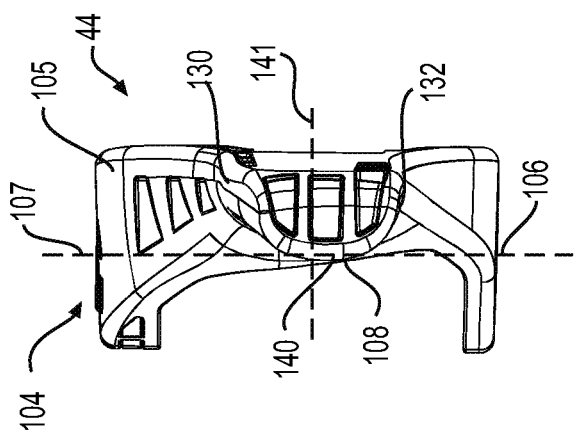
Figure 6C:
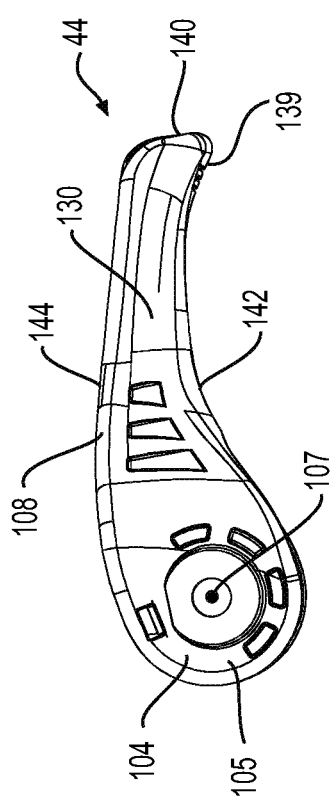
Figure 6D:
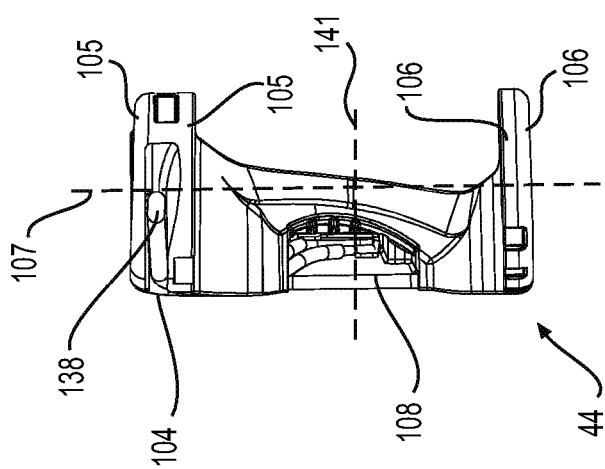
Figure 6G:
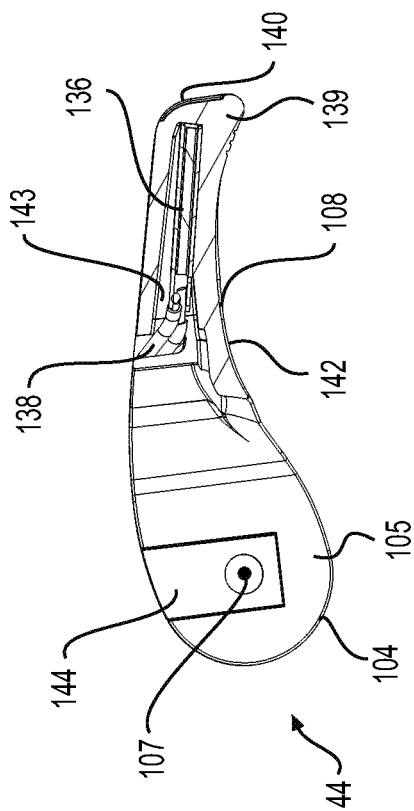
FIG. 6G is a cross-sectional view taken along the line 6G-6G of FIG. 6A.
Figure 6F:
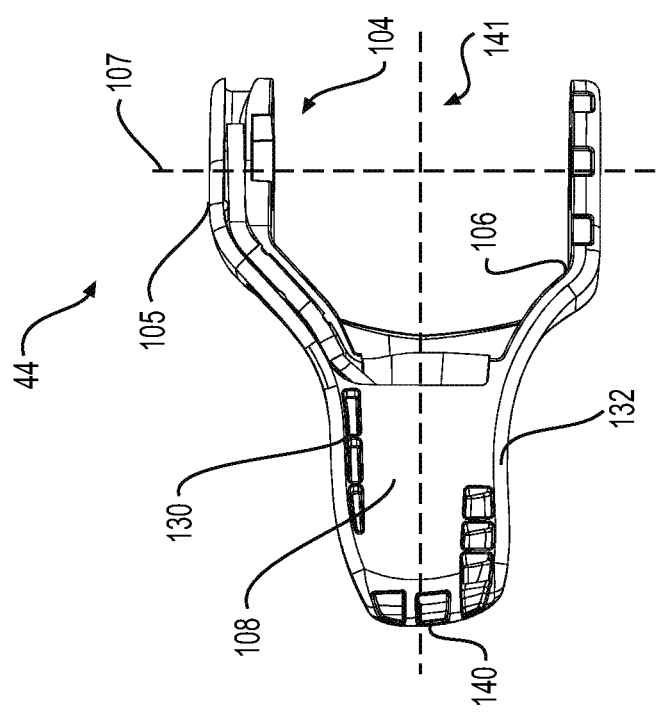

With reference to FIG. 6F, the finger surface 132 (which may be referred to as a second surface) is ergonomically shaped to be suitable for a finger grip of the throttle lever 44. The finger surface 132 curves downwards from the pivot portion 104 to a generally flat surface in the middle of the lever portion 108 which remains substantially flat to the outer edge 140. The generally flat surface 132 serves to provide a comfortable and stable finger grip and aids in preventing the forefinger from slipping off the throttle lever 44 when the throttle lever 44 is operated with the forefinger, either in the finger position or in the thumb position during a sharp right turn when some drivers rotate their hand to operate the throttle lever 44 with the forefinger.

With reference to FIG. 6A, the surface 142 extending between the thumb and finger surfaces 130, 132 of the throttle lever 44 has shallow grooves 146 to provide frictional contact with the hand and/or fingers to aid in maintaining a stable grip of the throttle lever 44.

With reference to FIGS. 6B, 6C and 6E, the surface 142 is curved inwards in the middle of the lever portion 108. Near the outer edge 140 of the lever portion 108, the surface 142 extends outwards to form a lip 139. The lip 139 also helps to prevent the fingers from sliding off the outer edge 140 of the lever 44.

As best seen in FIGS. 6D and 6G, the throttle lever has a hollow interior 143. A heater element 136 is housed inside the pocket 143 for heating the throttle lever 44. The heater element 136 includes a resistive element which is heated by passing electric current through it. The current can be selectively turned on and off by the driver, or automatically by the ECU 50, and its magnitude (thus the amount of heating provided by the heating element) can be similarly regulated. The wire 138 connected to the throttle heater element 136 extends out of the pocket 143 through a slot 144 (best seen in FIG. 6A) in the first flange 105 (FIG. 7) of the pivot portion 104 of the throttle lever 44.

The construction of the throttle control module 100 and its assembly with the handlebar 37 will now be described with reference to FIGS. 7 to 9C.

Figure 8A:
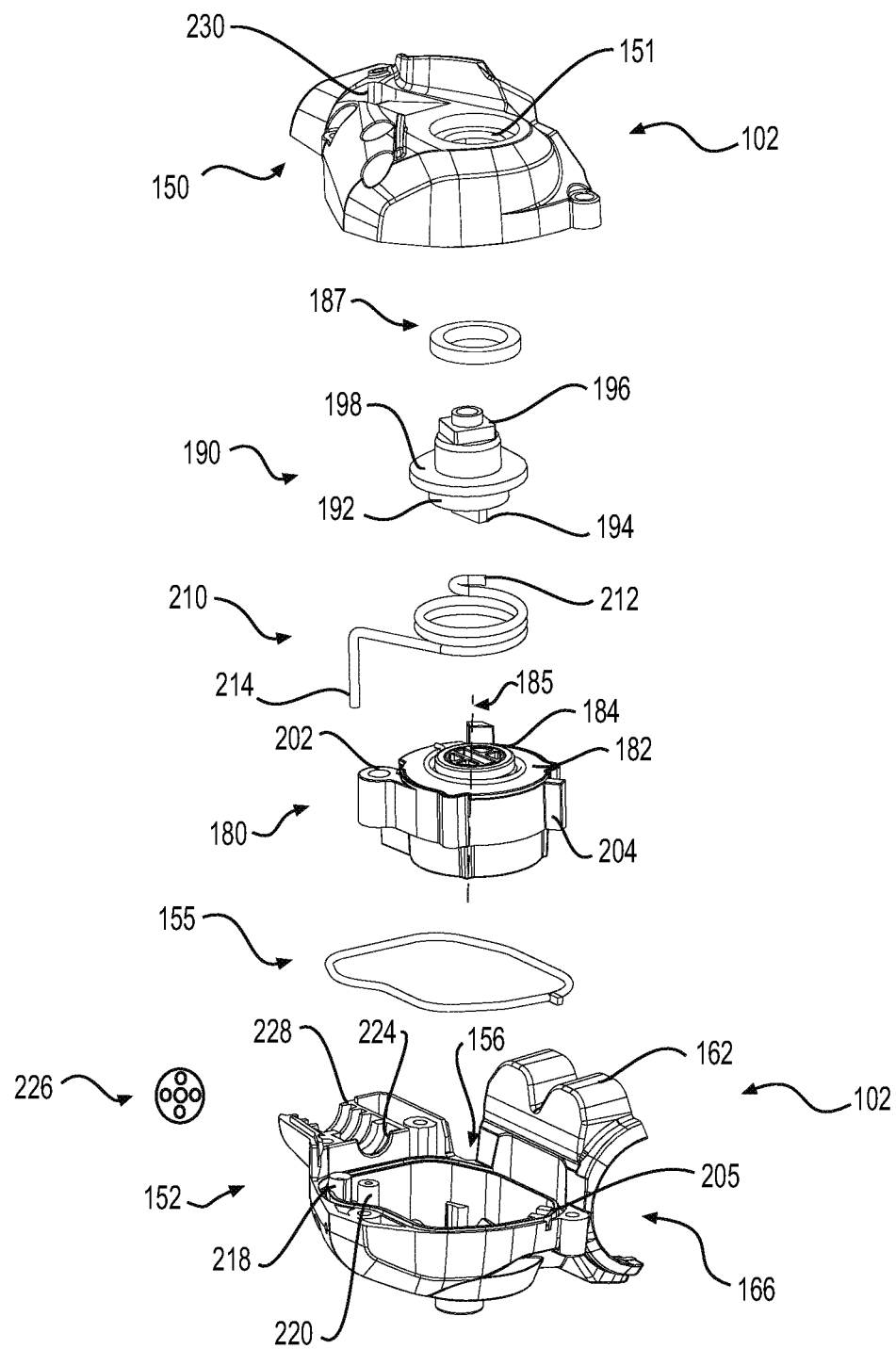
FIG. 8A is an enlarged perspective view, taken from a rear right side, of some of the components of the throttle control module of FIG. 4A illustrating the assembly of a position sensor inside a housing.
Figure 8B:
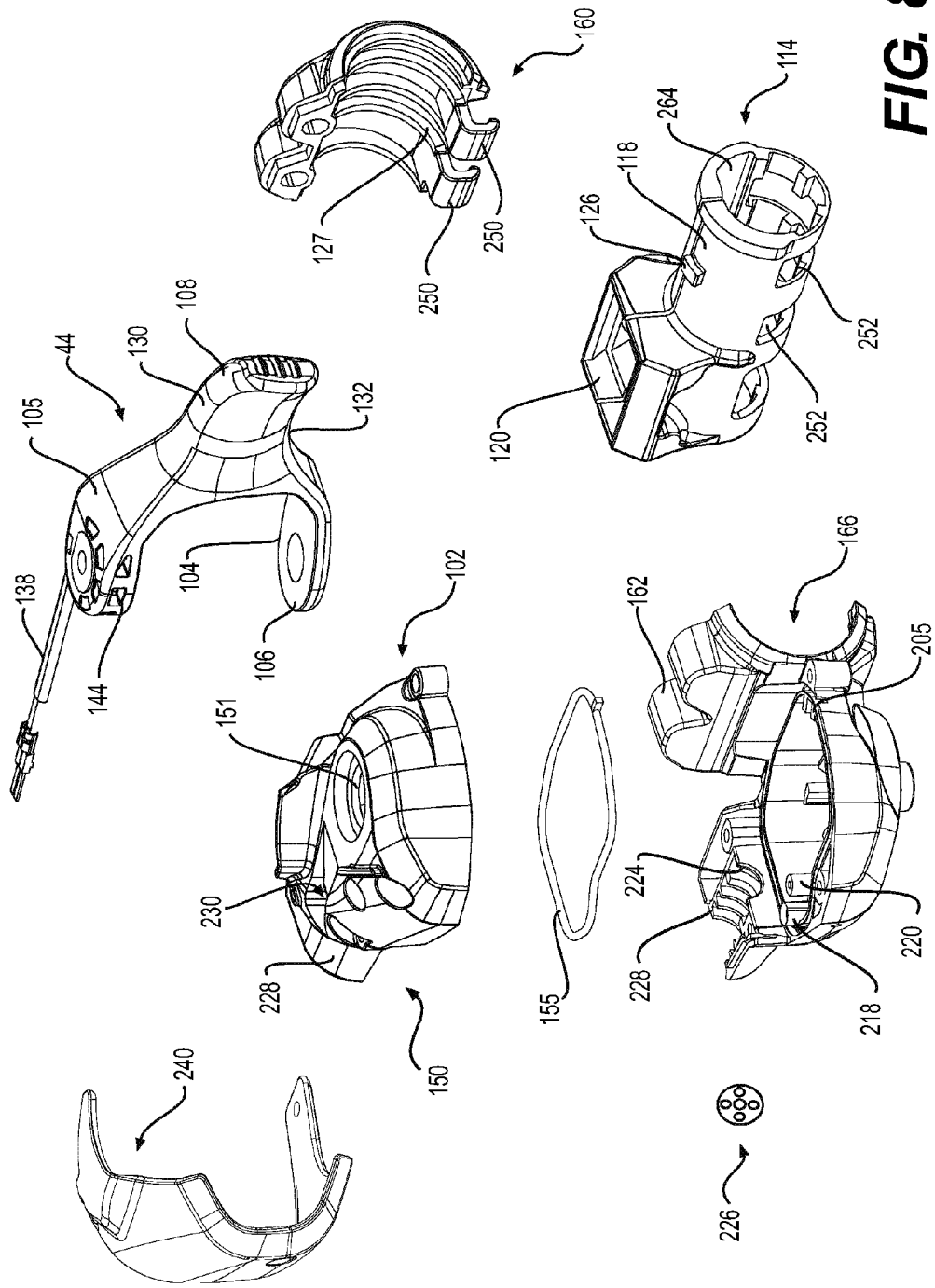
FIG. 8B is an enlarged perspective view, taken from a rear right side, of some of the components of the throttle control module of FIG. 4A illustrating the assembly of the housing.

With reference to FIGS. 7, and 8B, the throttle lever housing 102 of the throttle control module 100 comprises a first portion 150 and a second portion 152 that are fastened together by screws 154. A gasket 155 is disposed between the edges of portion 150 and 152 to define a sealed chamber 156 between them. The first and second flanges 105, 106 of the throttle lever 44 respectively attach to the first and second portions 150, 152 on opposite sides of the chamber 156. The first and second flanges 105, 106 are connected to the first and second portions 150, 152 by fasteners 103.

The throttle lever housing 102 has a first 160 and second 162 complementary handlebar connection portions fastened together to form a cylindrical hollow space 166 between them for enclosing the handlebar 37 and tubular portion 118 of the sleeve 114. The tubular portion 118 is thus disposed radially between the handlebar 37 and the handlebar connection portions 160, 162. The second handlebar connection portion 162 is integrally formed with the second housing 152. The middle of the chamber 156 enclosed by the first and second portions 150, 152 and the cylindrical space 166 enclosed by the first and second handlebar connection portions 160, 162 are generally aligned when the housing 102 is assembled.

With reference to FIGS. 7 and 8A, a Hall effect position sensor 180 is placed inside the chamber 156 and connected to the throttle lever 44 to sense the position of the throttle lever 44. The Hall effect position sensor 180 includes a base 182, a rotary portion 184 rotatably connected to the base 182 and a return spring 186 (FIG. 9A) connected between them to bias the rotary portion 184 toward a zero-position. The rotary portion 184 has a pair of magnets 188 on diametrically opposite sides of the rotation axis 185. The base portion 182 has a Hall effect sensor 181, which is sensitive to the magnetic field of the magnets 188, and thereby to the position of the rotary portion 184. The throttle lever 44 is rigidly connected to the rotary portion 184 of the Hall effect position sensor 180 by an adaptor 190. The pivot axis 107 of the throttle lever 44 and the rotation axis 185 of the rotary portion 184 are aligned. The position of the throttle lever 44 about the pivot axis 107 is therefore coupled with the position of the rotary portion 184 about the rotational axis 185. The Hall effect sensor 181 in the base portion 182 therefore senses the position of the throttle lever 44. The Hall effect position sensor 180 sends signals indicative of the throttle lever position to the ECU 50. The ECU 50 regulates the throttle valve 70, based on the received signal (and other additional inputs as discussed above), by sending appropriate signals to the actuator 74 connected to the throttle valve 70.

The adaptor 190 has a cylindrical body 192 with flanges 194, 196 on opposite sides to couple to the rotary portion 184 and the throttle lever 44 respectively. The rectangular flange 194 extending outwards from one end of the cylindrical body 192 fits into a rectangular slot 193 of the rotary portion 184 and the square knob-like flange 196 extending outwards on the opposite end fits into a square groove (not shown) in the first flange 105 of the throttle lever pivot portion 104 which is inserted into the chamber 156 through an opening 151 in the first portion 150. A seal 187 seals the aperture 151 around the adaptor 180. An annular flange 198 extends outwards from the cylindrical body 192 with a post 200, best seen in FIG. 9A, projecting outwards from the annular flange 198 towards the Hall effect position sensor 180.

A return spring 210, in the form of a torsion coil, is attached between the adaptor 190 and the second portion 152 in order to bias the throttle lever 44 towards the "idle" position. The helical section 216 of the torsion coil 210 is disposed around the cylindrical body 192 with one end 212 of the coil 210 looped around the post 200 (FIG. 9A) projecting outwards from the annular flange 198 of the adaptor 190 and the opposite end 214 of the coil 210 inserted into an aperture in a post 218 attached to an inside wall of the chamber 156. Both springs 210 and 186 bias the throttle lever 44 towards an idle position, where the free end of the throttle lever 44 furthest from the handlebar grip 40.

With reference to FIG. 8A, the base portion 182 of the Hall effect position sensor 180 is rotationally fixed with respect to the second portion 152 by a cylindrical through hole 202 disposed parallel to the rotational axis 185 on one side of the base portion 182 and a tab 204 extending outwards perpendicular to the rotational axis 185 from the opposite side. The through-hole 202 receives a complementary cylindrical post 220 extending inwards into the chamber 156 of the second portion 152 and the tab 204 fits into a complementary slot 205 of the second portion 152 thereby preventing the base portion 182 from rotating with the second portion 152 when the throttle lever 44 is pivoted.

With reference to FIGS. 7 and 8B, the throttle lever 44, connected to the throttle lever housing 102 as described above, extends laterally outwards on one side of the throttle lever housing 102. On the opposite side of the laterally extending throttle lever 44, the chamber 156 has a port 224 for receiving the wire 262 connecting the ECU 50 to the Hall effect position sensor 180. A grommet 226 is inserted into the port 224 in order to protect the wires and seal the chamber 152 from dust, snow etc. The input port 224 into the chamber 152 is surrounded by a tubular portion 228 extending outwards from the throttle lever housing 102 in order to guide and support the wires 45 and 138 and to provide additional protection from the elements. The opposite end of the tubular portion 228 is open at the end opposite the input port 224. The tubular portion 228 and the input port 224 are defined respectively by complementary semi-cylindrical tubes and semi-circular apertures formed in the first and second portion 150, 152, however, it is contemplated that these structures could be defined entirely in either the first or second portion 150 or 152.

As best seen in FIG. 8B, an aperture 230 is defined in the part of the tubular portion 228 formed in the first portion 150. The throttle lever heater element wire 138 is inserted into the tubular portion 228 through this aperture 230. A cover 240 is provided to cover the otherwise exposed portion of the throttle lever heater element wire 138 extending between the first flange 105 of the throttle lever 44 and the aperture 230 of the throttle lever housing 102. The cover 240 is shaped to fit over first and second portions 150, 152 leaving a gap 242 (FIG. 9A) for the throttle lever heater element wire 138 between the first portion 150 and the cover 240. The cover 240 is fastened to the first and second portions by screws 244, however, it is contemplated that other means could be used to fasten the cover 240 to the throttle lever housing 102, and also that the cover 240 could be shaped to cover only part of the exposed portion of the throttle lever heater element wire 138.

The sleeve 114, as mentioned above, has a cylindrical portion 118 coaxially disposed around the handlebar 37. The engine cut-off switch 116 is housed in an engine cut-off switch holder 120 integrally formed with the cylindrical portion 118 and extending outwards therefrom. The sleeve 114 is inserted over the handlebar 37 and the handlebar 37 is held tightly within so that the sleeve 114 is laterally and rotationally fixed to the handlebar 37 with the engine cut-off switch 116 extending upwards from it. The engine cut-off switch holder 120 is formed towards the inner end of the cylindrical portion 118, however, it is contemplated that it could be anywhere along the cylindrical portion 118. It is also contemplated that the engine cut-off switch holder 120 could be separate from the sleeve 114 and be located elsewhere on the handlebar 37.

Figure 10A:
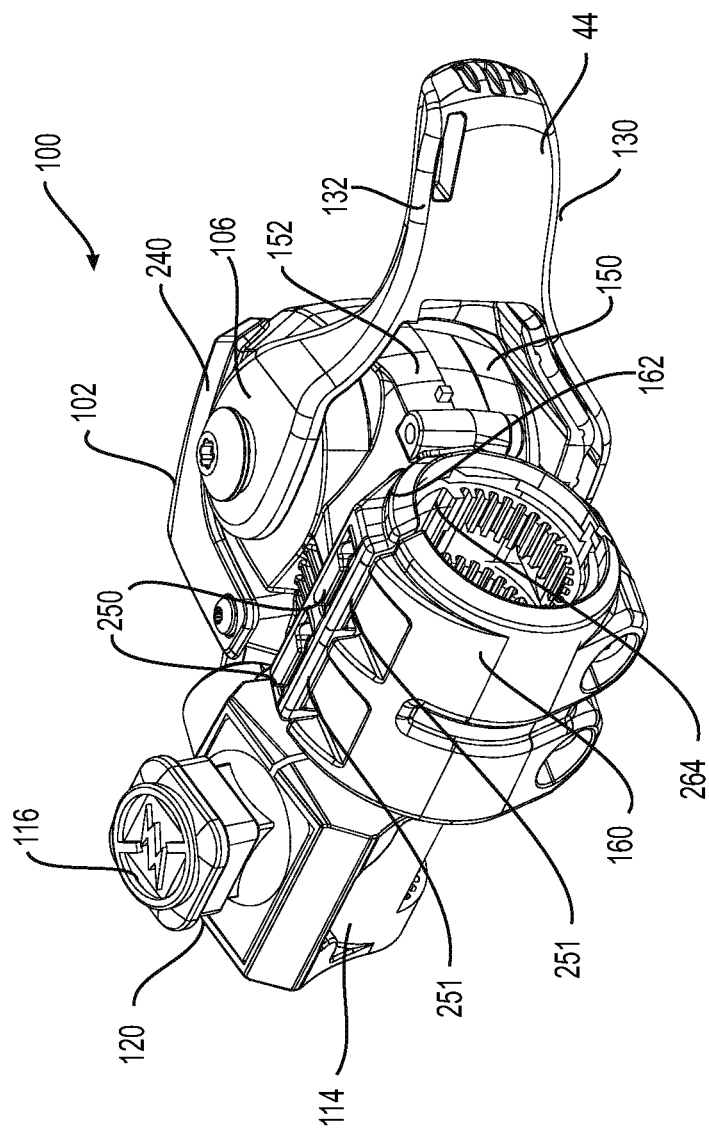
FIGS. 10A and 10B are perspective views, taken from a rear right side, of the throttle control module, with the throttle lever in the finger position of FIG. 4B and in the thumb position of FIG. 4A respectively.
Figure 10B:
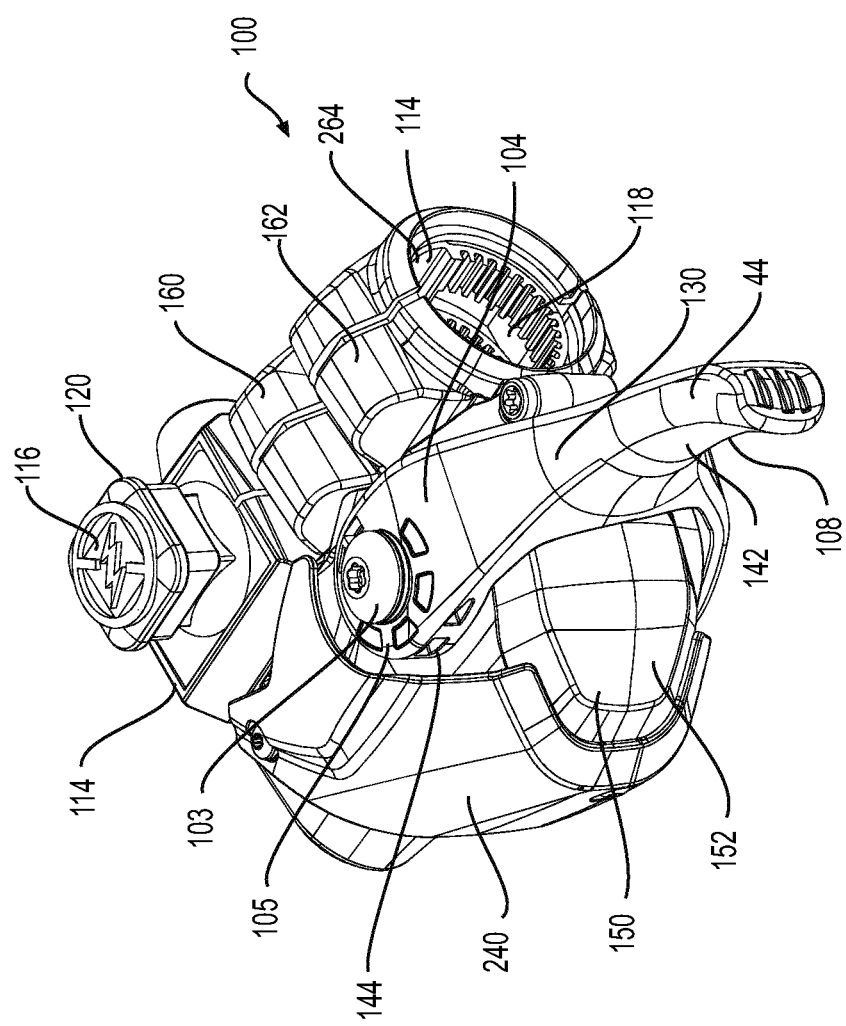
Figure 11A:
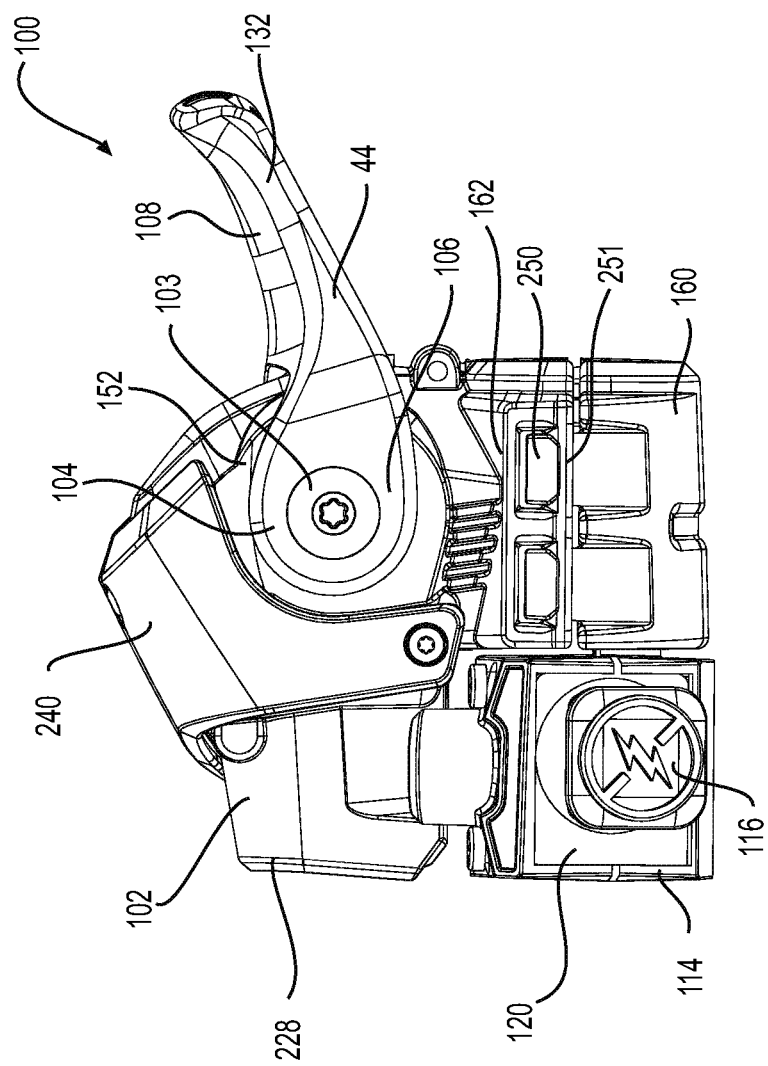
FIGS. 11A and 11B are top plan views of the throttle control module of FIGS. 10A and 10B respectively.
Figure 11B:
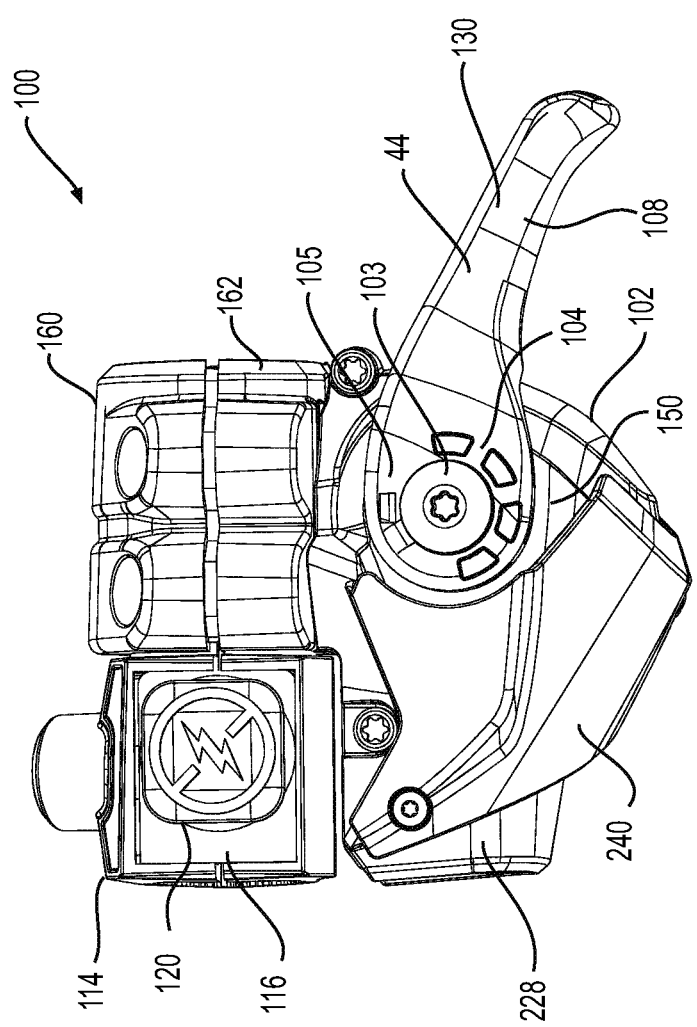
Figure 12A:
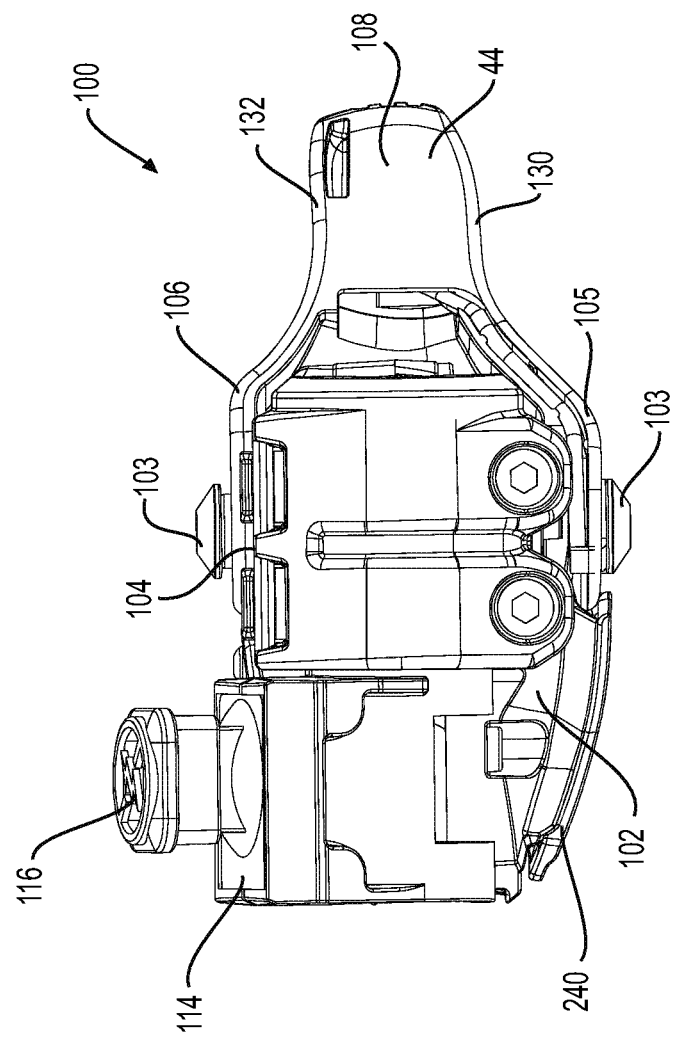
FIGS. 12A and 12B are rear elevation views of the throttle control module of FIGS. 10A and 10B respectively.
Figure 12B:
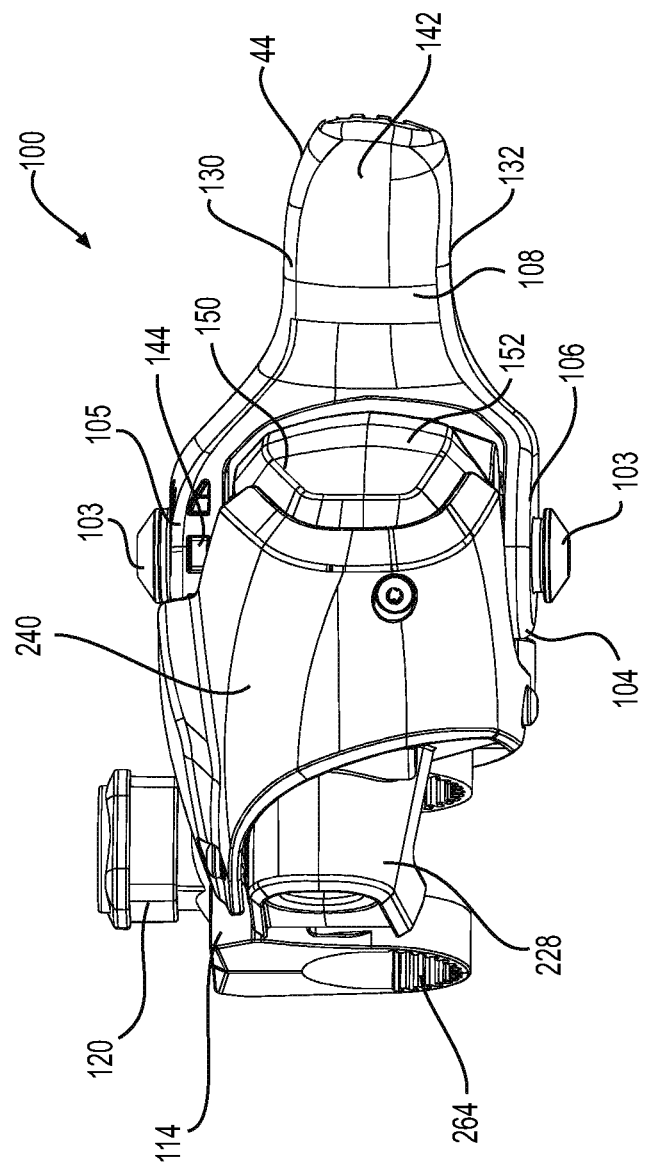

The handlebar connection portions 160, 162 of the throttle lever housing 102 surround the cylindrical portion 118 of the sleeve 114 so as to be rotatable about it. On one side, adjacent to the second flange 106, the handlebar connection portions 160, 162 of the first and second portion 150, 152 are interlocked by means of a pair of hooks 250 (best seen in FIG. 8B) on handlebar connection portion 160 that fit around a pair of loops 251 (best seen in FIG. 10A) on the other handlebar connection portion 162. On the other side, adjacent to the first flange 105, the handlebar connection portions 160, 162 of the first and second portion 150, 152 are clamped together by screws.

With reference to FIG. 9B, a protrusion 126 on the upper surface of the cylindrical portion 118 of the sleeve 114 is received in a recess 127 (FIG. 9B) formed in the inner surface of the handlebar connection portions 160, 162 of the throttle lever housing 102 to prevent it from sliding laterally along the sleeve 114. It is also contemplated that, in some embodiments, the sleeve 114 and the throttle lever housing 102 could slide laterally with respect to each other.

With reference to FIG. 9C, the cylindrical portion 118 includes circumferential slots 252 on the side opposite to the protrusion 126. Complementary projections 254 of the handlebar connection portion 162 of the second portion 152 are received in the slots 252 to permit rotation of the throttle lever 44 between the thumb position and the finger position. The length of the slots 252 sets the rotation limits for the throttle lever housing 102 about the sleeve 114 and the handlebar 37. In the illustrated embodiment, the rotation of the throttle lever housing 102 is limited to 160 degrees by the slots 252 and complementary projections 254. It is, however, contemplated that the rotation limits could be less or more than 160 degrees. The position of the slots 252 on the sleeve 114 ensures that the throttle lever housing 102 can only be rotated in a direction 258 by making the throttle lever 44 pass underneath the handlebar 37.

With reference to FIG. 15, the throttle lever housing 102 is always rotated from the thumb position or the finger position in a direction such that the throttle lever 44 rotates away from the engine cut-off switch 116.

FIG. 15 shows the position of a portion of the throttle control module 100 as throttle lever housing 102 is rotated from a thumb position of the throttle lever 44 to a finger position of the throttle lever 44" via an intermediate throttle lever position 44' about axis 110 of handlebars 37. For clarity, elements of the throttle control module 100 in the finger position are labeled with the same reference number as when in the thumb position but with two apostrophes after the reference number (for example, throttle lever 44", cover 240" and finger surface 132"). Similarly, for clarity, elements of the throttle control module 100 in the intermediate position are labeled with the same reference number as when in the thumb position but with one apostrophe after the reference number (for example, throttle lever 44', cable 112'). Elements of the throttle control module 100 which do not rotate with the throttle lever housing 102 are labeled with their corresponding reference numbers without any apostrophes.

As can be seen from FIG. 15, the throttle lever housing 102 is rotated around the handlebar 37 and the sleeve 114 such that the throttle lever 44 rotates around the handlebar on the side opposite to the engine cut-off switch 116. Thus, the handlebar 37 is disposed between the engine cut-off switch 116 and the intermediate position throttle lever 44'.

As the throttle lever housing 102 rotates around the handlebar 37, the tubing 112 carrying the throttle lever heater wire 138 and the position sensor wire 262 moves from its position 112 on one side of the handlebar 37 to a position 112" on the opposite side thereof. The tubing 122 however, which carries the handlebar heater wire 260 and the engine cut-off switch wire, remains fixed. Thus, in the thumb position, the tubing 112 and 122 are on opposite sides of the handlebar 37, and in the finger position, the tubing 122 and 112" are on the same side of the handlebar 37 with the tubing 112" being disposed underneath the tubing 112. The rotation of the throttle lever housing 102 in a direction away from the engine cut-off switch 116 and the position of the tubing 122 and 112 ensures that there is no inadvertent contact of the engine cut-off switch with the tubing 122 or any part of the housing 102, and additionally that the tubing 122 and 112 do not get tangled with each other.

Rotating about handlebar axis 110 ensures the relative operation between throttle valve 70 and throttle lever 44 remains unchanged regardless of whether the throttle lever 44 is a thumb-activating position 44 or a finger-activating position 44". As shown in FIG. 15, the idle throttle lever positions 44 and 44" remain equidistance from the handlebar axis 110.

FIGS. 10A to 13B show various views of the sleeve 114 and the throttle lever housing 102 with the throttle lever 44 disposed in the thumb and finger positions.

The sleeve 114 has a groove 264 on the inner surface in contact with the handlebar 37, as best seen in 9C, 10A and 10B. The groove 264 receives the handlebar heater element wire 260 (FIG. 9C) connecting to a handlebar heater element (not shown) for heating the handlebar 37. The handlebar heater element wire 260 and the engine cut-off switch wire (not shown) extend out of the sleeve 114 to the ECU 50 through tubing 122.

Figure 13A:
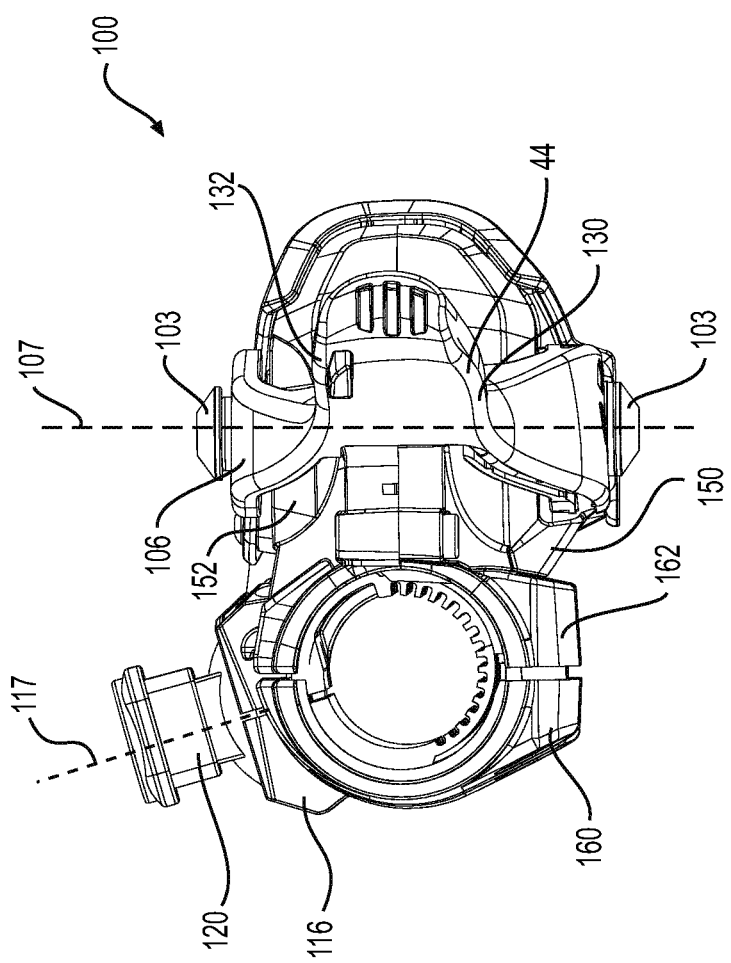
FIGS. 13A and 13B are respectively a right side elevation view and a left side elevation view of the throttle control module of FIG. 10A.
Figure 13B:
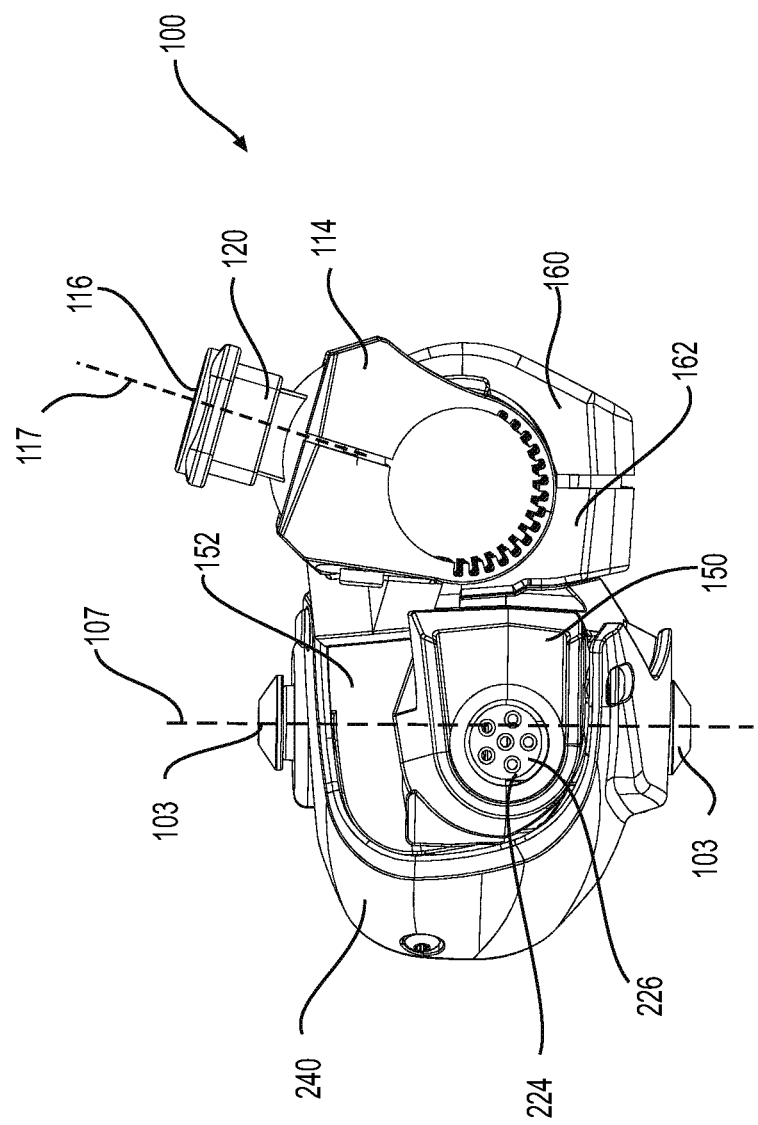

As can be seen in FIGS. 13A and 13B, the engine cut-off switch 116 is disposed to be pushed inwards at an angle to the pivot axis 107 and perpendicular to the handlebar axis 110. The pivot axis 107 of the throttle lever 44 can, if desired, be aligned parallel or at any other angle with respect to the axis 117 of the kill switch 116. It is also contemplated that the engine cut-off switch 116 could be provided elsewhere on the handlebar 37 and the switch holder 120 is omitted from the sleeve 114.

Figure 14A:
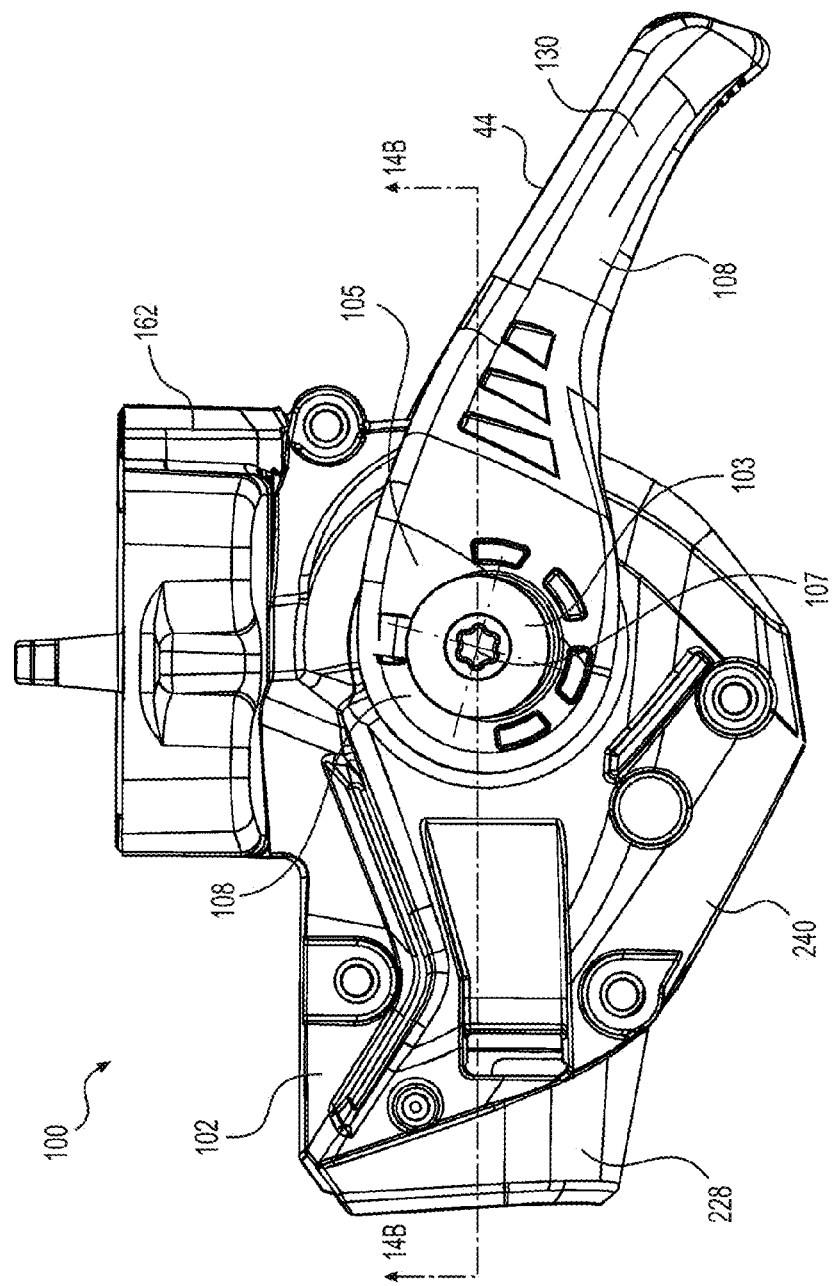
FIG. 14A is a top plan view of a portion of another embodiment of a throttle control module.
Figure 14B:
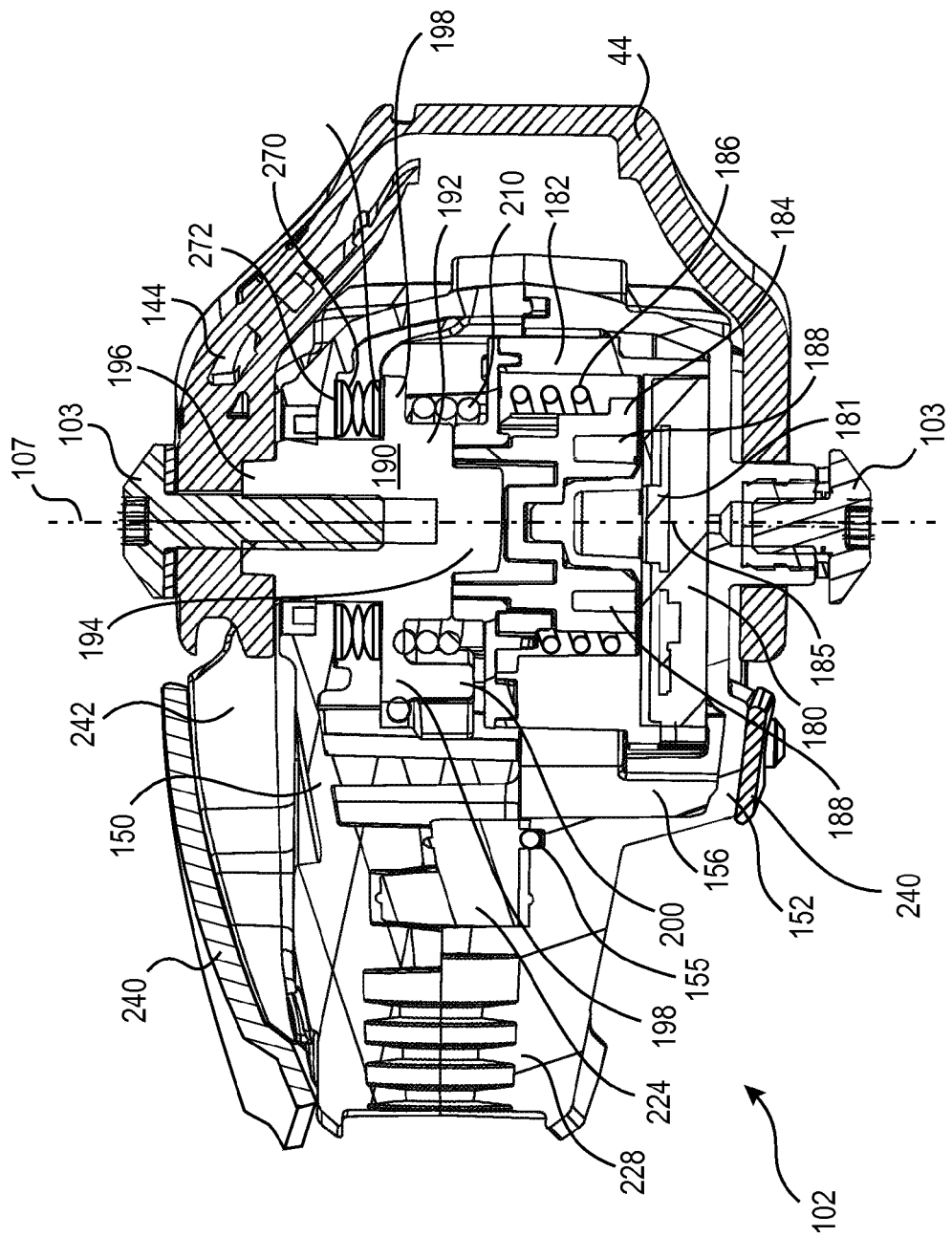
FIG. 14B is a cross-sectional view, taken along the line 14B-14B of the portion of the throttle control module of FIG. 14A.

With reference to FIGS. 14A and 14B, in another embodiment of a throttle control module 100, a wave spring 270 is disposed coaxially with the cylindrical body of the adapter 190. The wave spring 270 is disposed between the flange 198 and the inner surface of the first portion 150. As can be seen from FIGS. 14B and 9A, in order to accommodate the wave spring 270, the first portion 150 of the throttle lever housing 102 of FIG. 14A is structured to provide a greater separation between its inner surface and the adaptor flange 198 than the first portion than that provided in the throttle lever hosting 102 of FIG. 9A. A washer 272 is placed at each end of the wave spring 270.

The wave spring 270 provides additional inertia against the rotational motion of the throttle lever 44 around the rotational axis 185. A greater force is thus required to rotate the throttle lever 44 when a wave spring 270 is placed around the adapter 190 than when the wave spring 270 is omitted. When the throttle lever is pivoted to a given position, the wave spring 270 aids in maintaining the throttle lever 44 in that position. It is contemplated that, instead of the wave spring 270, an annular member made of resilient material such as rubber could be placed between the adaptor flange 198 and the first portion 150. It is further contemplated that a helical coil spring could be used instead of the wave spring 270.

In use, the snowmobile 10 is driven with the throttle lever 44 disposed in the thumb position. When the driver wishes to change the grip to the finger position, the driver stops the snowmobile 10. The throttle lever housing 102 is then rotated to the finger position by passing the throttle lever 44 under the handlebar 37 so that it is disposed forward of the handlebar 37. The driver then resumes driving the snowmobile 10 with the throttle lever 44 disposed in the finger position.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A vehicle, comprising:
   a frame;
   a steering assembly including a handlebar connected to the frame, the handlebar extending in a lateral direction and defining a handlebar axis;
   an engine connected to the frame;
   a throttle body fluidly communicating with the engine;
   a throttle valve in the throttle body for controlling fluid flow to the engine, the throttle valve having an open position and a closed position;
   a throttle control module for controlling a position of the throttle valve, the throttle control module comprising:
      a throttle lever housing rotatably connected to the handlebar; and
      a throttle lever operatively connected to the throttle valve to control the position of throttle valve, the throttle lever extending outwardly from the throttle lever housing in the lateral direction, the throttle lever comprising a pivot portion and a lever portion extending laterally outwards from the pivot portion, the pivot portion being pivotably connected to the throttle lever housing to define a pivot axis extending through the pivot portion, the throttle lever being configured to pivot at least between an idle position and a drive position about the pivot axis relative to the throttle lever housing,
the pivot axis extending perpendicular to the handlebar axis,
the pivot axis being spaced from the handlebar, and
the throttle lever housing rotating, with the throttle lever, about the handlebar at least between:
  a first position in which the pivot axis is rearward of the handlebar and the lever portion is rearward of the handlebar when the throttle lever is in the idle position such that, in the first position, the throttle lever is positioned to be pivoted by a thumb of a driver driving the vehicle; and
  a second position in which the pivot axis is forward of the handlebar and the lever portion is forward of the handlebar when the throttle lever is in the idle position such that, in the second position, the throttle lever is positioned to be pivoted by at least one finger, other than the thumb, of the driver driving the vehicle.

2. The vehicle of claim 1, wherein the throttle lever comprises:
a first surface shaped to receive the thumb for pivoting of the throttle lever by the thumb when the throttle lever housing is in the first position; and
a second surface shaped to receive the at least one finger, other than the thumb, for pivoting of the throttle lever by the at least one finger, other than the thumb, when the throttle lever housing is in the second position;
wherein:
the first surface is above the second surface when the throttle lever is in the first position;
the second surface is above the first surface when the throttle lever is in the second position; and
the first surface and the second surface extend laterally outwards from the pivot portion.

3. The vehicle of claim 2, wherein the throttle control module comprises a throttle lever position sensor adapted for sensing the position of the throttle lever about the pivot axis and for sending a signal related to the position; and
the vehicle further comprises:
  an actuator operatively connected to the throttle valve for changing the position of the throttle valve; and
  an engine control unit connected to the throttle lever position sensor, receiving the signal from the throttle lever position sensor, and being connected to the actuator to control the engine.

4. The vehicle of claim 3, wherein the throttle lever position sensor is a Hall effect position sensor disposed inside a chamber of the throttle lever housing, the throttle lever being disposed outside the chamber,
the Hall effect position sensor comprising:
  a base portion rigidly connected to the throttle lever housing;
  a rotary portion rotatably connected to the base portion; and
  a Hall effect position sensor biasing member connected between the base portion and the rotary portion, the Hall effect position sensor biasing member being configured to bias the rotary portion toward a zero position with respect to the base portion,
wherein the rotary portion is rigidly connected to the throttle lever such that the idle position of the throttle lever corresponds to the zero position of the rotary portion.

5. The vehicle of claim 4, wherein the throttle control module further comprises an adaptor rigidly connecting the throttle lever and the rotary portion of the Hall effect position sensor, the adaptor having a first flange complementary to the rotary portion of the Hall effect position sensor and a second flange complementary to the throttle lever.

6. The vehicle of claim 5, wherein the adaptor is disposed inside the chamber of the throttle lever housing.

7. The vehicle of claim 5, wherein the throttle control module further comprises a biasing member connected between the adaptor and the throttle lever housing, the biasing member configured to bias the adaptor such that the rotary portion of the Hall effect position sensor is biased toward the zero position and the throttle lever is biased toward the idle position.

8. The vehicle of claim 4, wherein the throttle lever housing further comprises at least one input port for connecting at least one wire to the Hall effect position sensor disposed inside the chamber.

9. The vehicle of claim 8, wherein the throttle control module further comprises a tubular portion for housing at least a portion of the at least one wire, the tubular portion having an end surrounding at least one of the at least one input port.

10. The vehicle of claim 1, wherein the throttle control module further comprises a biasing member connected between the throttle lever and the throttle lever housing, the biasing member biasing the throttle lever towards the idle position.

11. The vehicle of claim 1, wherein the throttle control module further comprises:
  a throttle lever heating element disposed inside the throttle lever for heating the throttle lever; and
  a throttle lever heating element wire connected to the throttle lever heater element.

12. The vehicle of claim 11, wherein the throttle lever housing has an aperture for receiving the throttle lever heater element wire from the throttle lever, and the throttle control module further comprises a cover removably connected to the throttle lever housing and adapted to cover at least a part of the throttle lever heater element wire.

13. The vehicle of claim 1, wherein the vehicle further comprises a sleeve, wherein:
  the sleeve includes a tubular portion disposed around the handlebar and rigidly connected to the handlebar,
  the throttle lever housing is rotatably connected to the tubular portion of the sleeve, and
  the sleeve is disposed between the handlebar and the throttle lever housing.

14. The vehicle of claim 13, wherein
one of the tubular portion of the sleeve and the throttle lever housing has a protrusion, and
the other of the tubular portion of the sleeve and the throttle lever housing has a complementary groove to prevent lateral motion of the throttle lever housing.

15. The vehicle of claim 13, wherein
one of the tubular portion of the sleeve and the throttle lever housing has a protrusion, and
the other of the tubular portion of the sleeve and the throttle lever housing has a complementary groove defining a limit for rotation of the throttle lever housing about the sleeve.

16. The vehicle of claim 13, further comprising an engine cut-off switch adapted to stop an operation of the engine, wherein:

an engine cut-off switch holder is connected to the sleeve, and the engine cut-off switch is at least partially disposed in the engine cut-off switch holder.

17. The vehicle of claim 16, wherein:

the throttle lever housing rotates, with the throttle lever, from each one of the first and second positions, in a direction such that the throttle lever moves away from the engine cut-off switch.

18. A vehicle, comprising:

a frame;

a steering assembly including a handlebar connected to the frame, the handlebar extending in a lateral direction and defining a handlebar axis;

a motor connected to the frame;

a throttle control module for controlling an operation of the motor, the throttle control module comprising:

a throttle lever housing rotatably connected to the handlebar; and a throttle lever operatively connected to the motor, the throttle lever extending outwardly from the throttle lever housing in the lateral direction, the throttle lever comprising a pivot portion and a lever portion extending laterally outwards from the pivot portion, the pivot portion being pivotably connected to the throttle lever housing to define a pivot axis extending through the pivot portion, the throttle lever being configured to pivot at least between an idle position and a drive position about the pivot axis relative to the throttle lever housing, the pivot axis extending perpendicular to the handlebar axis, the pivot axis being spaced from the handlebar, and the throttle lever housing rotating, with the throttle lever, about the handlebar at least between:

a first position in which the pivot axis is rearward of the handlebar and the lever portion is rearward of the handlebar when the throttle lever is in the idle position such that, in the first position, the throttle lever is positioned to be pivoted by a thumb of a driver driving the vehicle; and a second position in which the pivot axis is forward of the handlebar and the lever portion is forward of the handlebar when the throttle lever is in the idle position such that, in the second position, the throttle lever is positioned to be pivoted by at least one finger, other than the thumb, of the driver driving the vehicle.

19. The vehicle of claim 18 wherein:

a direction parallel to the handlebar axis is a first direction;

a direction perpendicular to the handlebar axis and the pivot axis is a second direction; and the throttle lever comprises a point farthest from the pivot axis, a displacement of the point in the first direction and between the idle and drive positions being a first direction displacement, a displacement of the point in the second direction and between the idle and drive positions being a second direction displacement, and the first direction displacement being less than the second direction displacement.

20. The vehicle of claim 18 wherein:

a direction parallel to the handlebar axis is a first direction;

a direction perpendicular to the handlebar axis and the pivot axis is a second direction; and the throttle lever comprises a point farthest from the pivot axis, a displacement of the point in the first direction and between the idle and drive positions being a first direction displacement, a displacement of the point in the second direction and between the idle and drive positions being a second direction displacement, and the first direction displacement being zero.

* * * * *